(12) United States Patent
Kessler et al.

(10) Patent No.: US 8,997,656 B2
(45) Date of Patent: Apr. 7, 2015

(54) VEHICLE SLING BAG RAIL SYSTEM

(75) Inventors: Terry W. Kessler, Warsaw, IN (US);
Travis W. Elliott, Goshen, IN (US);
Richard D. Eichstedt, South Bend, IN (US)

(73) Assignee: Utilimaster Corporation, Wakarusa, IN (US)

( * ) Notice: Subject to any disclaimer, the term of this patent is extended or adjusted under 35 U.S.C. 154(b) by 334 days.

(21) Appl. No.: 13/026,711

(22) Filed: Feb. 14, 2011

(65) Prior Publication Data

US 2011/0203478 A1 Aug. 25, 2011

Related U.S. Application Data

(60) Provisional application No. 61/305,282, filed on Feb. 17, 2010.

(51) Int. Cl.
| | |
|---|---|
| *B61B 3/00* | (2006.01) |
| *B61K 1/00* | (2006.01) |
| *B60P 3/05* | (2006.01) |
| *B60P 1/54* | (2006.01) |

(52) U.S. Cl.
CPC *B60P 3/05* (2013.01); *B60P 1/5409* (2013.01)

(58) Field of Classification Search
USPC .......................... 104/89–91; 258/10, 23, 24
See application file for complete search history.

(56) References Cited

U.S. PATENT DOCUMENTS

| | | | | |
|---|---|---|---|---|
| 1,353,738 | A * | 9/1920 | Gilbertson | 258/10 |
| 1,425,167 | A * | 8/1922 | Biggs | 258/10 |
| 4,194,867 | A * | 3/1980 | Bragg | 414/542 |
| 5,062,760 | A * | 11/1991 | Samaniego | 414/542 |
| 6,126,379 | A * | 10/2000 | Feldman et al. | 414/542 |
| 6,398,410 | B1 * | 6/2002 | Guerra | 383/24 |

\* cited by examiner

*Primary Examiner* — R. J. McCarry, Jr.
(74) *Attorney, Agent, or Firm* — Barnes & Thornburg LLP

(57) ABSTRACT

An embodiment of the present disclosure provides a vehicle having a cargo area that includes an internal surface. A longitudinally extending bar is located within the cargo area of the vehicle. A bag configured to hang onto and slide along the longitudinally extending bar. A movable rail assembly is attached to the internal surface and includes: a rail moveable between extend and retract positions with respect to the cargo area; a bearing engageable with the rail to assist moving the rail between the extend and retract positions; and a bracket attachable to the bearing to suspend the bearing and the rail in the cargo area and away from the internal surface.

18 Claims, 27 Drawing Sheets

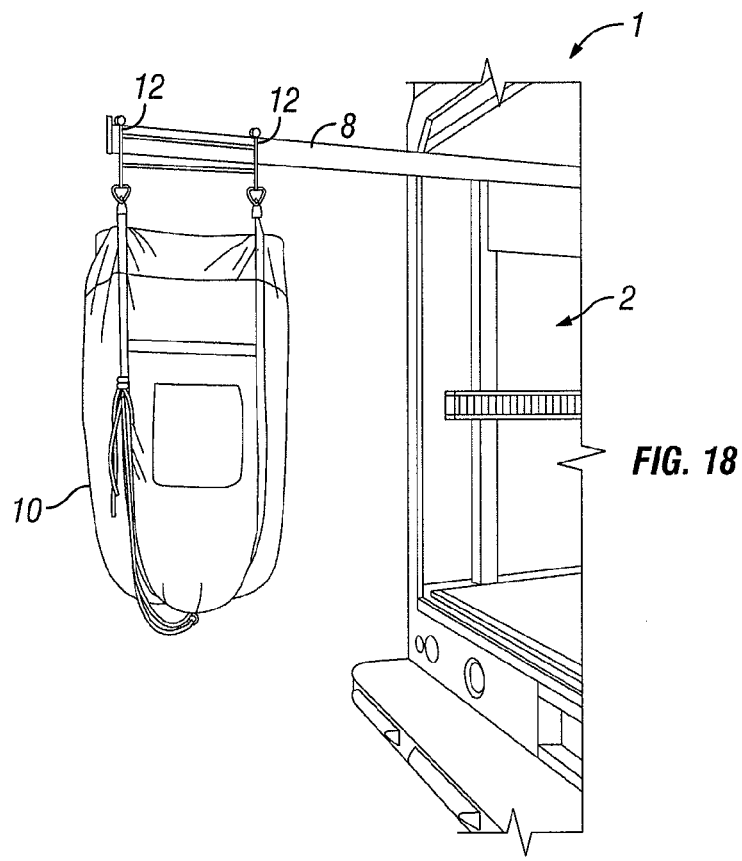
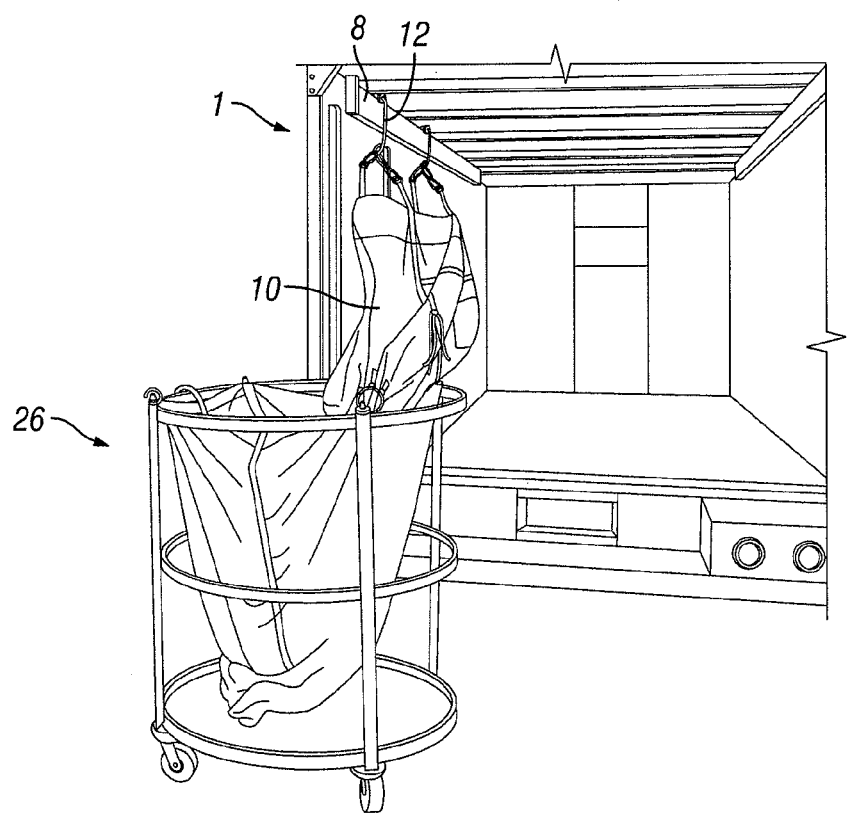

VEHICLE SLING BAG RAIL SYSTEM

RELATED APPLICATIONS

The present application claims priority to U.S. Provisional Patent Application, Ser. No. 61/305,282 filed on Feb. 17, 2010, entitled "Vehicle Sling Bag Rail System." To the extent not included below, the subject matter disclosed in that application is hereby expressly incorporated into the present application

TECHNICAL FIELD AND SUMMARY

The following disclosure relates to delivery vehicles. More particularly, the present disclosure relates to a rail system located in the cargo area of a delivery vehicle. The rail system is extendable to the exterior of the vehicle to suspend a container over the ground surface.

Delivery vehicles typically include forward cab and rearward cargo area sections. A typical cargo area is sized to hold packages, supplies, uniforms, etc. for delivery and pickup. Such delivery vehicles are commonly used by such companies as UPS, FedEx, Cintas, Aramark, G&K Services, and Unifirst.

In the case of uniforms, where both clean and soiled clothes are transported in the same delivery vehicle, there may be a lack of organization and efficiency. Clean laundry can be hung on hangers suspended from a rod inside the delivery vehicle. Soiled laundry is piled on the floor. The soiled laundry on the floor can be problematic if piled too high because it then has to be crawled over in order to access the hanging clean laundry. Furthermore, soiled laundry needs sorting. Pants, shirts, whites, food whites, permanent press and jackets need to be separated before washing. This requires substantial manpower to unload and sort the soiled laundry into separate containers before transporting it to the laundry facilities. (See Prior art FIGS. 12-15.)

An illustrative embodiment of the present disclosure includes a sling bag rail system that mounts to the sidewall of a delivery vehicle adjacent the rear or other exit. A rail is slidably coupled to a bearing surface allowing it to slide in and out of the cargo area of the vehicle. In further illustrative embodiments, the sling bag rail system may include a stationary bar or rail that can receive hanging bags of laundry. In one embodiment, hangers suspend the bags from the stationary rail. Rollers on the hangers allow the bags to easily roll along the rail. A latch holds the bags in place inside the cargo area so they do not inadvertently move around. Having multiple bags on the rail allow an operator to sort laundry immediately by putting certain articles of clothing in designated bags. The rollers on the hangers, not only allow repositioning the bags as desired, but also allow moving the bags to the sliding rail which moves the bags to the exterior of the truck.

In an illustrative embodiment, the rail normally couples to a bearing surface mounted onto one or more brackets which attaches to the sidewall of the vehicle. During operation, a sling bag or multiple sling bags hang from the stationary rail ready to receive laundry. When desired, the bag can be rolled from the stationary rail and onto the movable rail. Then sliding the rail out from the end of the vehicle suspends the bag over the ground surface. A cart or other container can then be pushed underneath the suspended sling bag. Opening the sling bag from the bottom releases its contents to the cart below.

Another illustrative embodiment of the present disclosure provides a vehicle that comprises a cargo area that includes an internal surface. A longitudinally extending bar is located within the cargo area of the vehicle. A bag that includes a first opening and a hanger that is configured to hang onto, and slide along, the longitudinally extending bar. A movable rail assembly is attached to the internal surface and comprises: a rail moveable between extend and retract positions with respect to the cargo area; a bearing engageable with the rail to assist moving the rail between the extend and retract positions; and a bracket attachable to the bearing to suspend the bearing and the rail in the cargo area and away from the internal surface. The second rail assembly is configured such that the bag with the hanger is movable from the bar to the rail. The rail is configured so at least a portion of the rail is movable exterior of the cargo area with the bag hanging on the rail so the bag is positionable exterior of the vehicle.

In the above and other illustrative embodiments, the cargo vehicle may further comprise: a transition bar located between the bar and the rail to provide a transition for the hanger when moving between the bar and rail; the bearing being a longitudinally extending bearing the rail is configured to be slidable on to move between the extend and retract positions; the bearing being a plurality of roller bearings the rail is configured to be slidable on to move between the extend and retract positions; a stop member selectively engageable with the rail to selectively inhibit movement of the rail; the rail and bar are positioned substantially parallel to and space apart from each other; the internal surface being a sidewall of the cargo area of the vehicle; the bracket being attached to the sidewall and configured to hold the hanger away from the sidewall; the bar being sized to receive a plurality of bags; a latch configured to selectively hold the bag in a location in the cargo area until the latch releases the bag; the bag including a second opening; the hanger including a roller to assist moving the bag between the rail and the bar; and the hanger holds the first opening in an open condition.

Another embodiment of the present disclosure provides a method of distributing clothing via a delivery vehicle, the method comprising the steps of: providing a longitudinally extending bar located within a cargo area of the delivery vehicle, and a bag that includes a hanger that hangs onto the longitudinally extending bar suspending the bag in the cargo area; receiving soiled laundry; placing the soiled laundry in the bag while the bag hangs on the bar; sliding the bag containing the soiled laundry along the bar and onto a movable rail of a rail assembly that also includes a bearing engageable with the rail allowing the rail to move, and a bracket attachable to the bearing to hold the bearing and the rail in the cargo area; moving the rail with the bag hanging thereon to an extended position so at least a portion of the rail and the bag is located exterior of the delivery vehicle; and making the soiled laundry in the bag available to be removed from the bag exterior or the vehicle.

In the above and other illustrative embodiments, the method of distributing clothing via the delivery vehicle further comprising the step of: providing a transition bar positioned between the bar and the rail providing a stop member; selectively engaging the stop member with the rail to release the rail; providing a plurality of bags that hangs onto the longitudinally extending bar suspending the plurality of bags in the cargo area; placing the soiled laundry in the bag while the bag hangs on the bar and unlatching a latch releasing the bag to slide the bag along the bar and rail.

Additional features and advantages of the sling bag rail system will become apparent to those skilled in the art upon consideration of the following detailed descriptions exemplifying the best mode of carrying out the sling bag rail system as presently perceived.

BRIEF DESCRIPTION OF THE DRAWINGS

The present disclosure will be described hereafter with reference to the attached drawings which are given as non-limiting examples only, in which:

FIG. 18 is a rear view of a sling bag extended from the rail extending out from the rear of the vehicle similar to that shown in FIG. 3 demonstrating how the bags full of laundry can be extended from the vehicle;

FIG. 19 is a perspective view of the rear of the vehicle similar to that shown in FIG. 11 demonstrating how the contents of that full sling bag can be emptied into a cart sitting on ground level;

The exemplification set out herein illustrates embodiments of the sling bag rail system, and such exemplification is not to be construed as limiting the scope of the sling bag rail system in any manner.

DETAILED DESCRIPTION OF THE DRAWINGS

Figure 1:
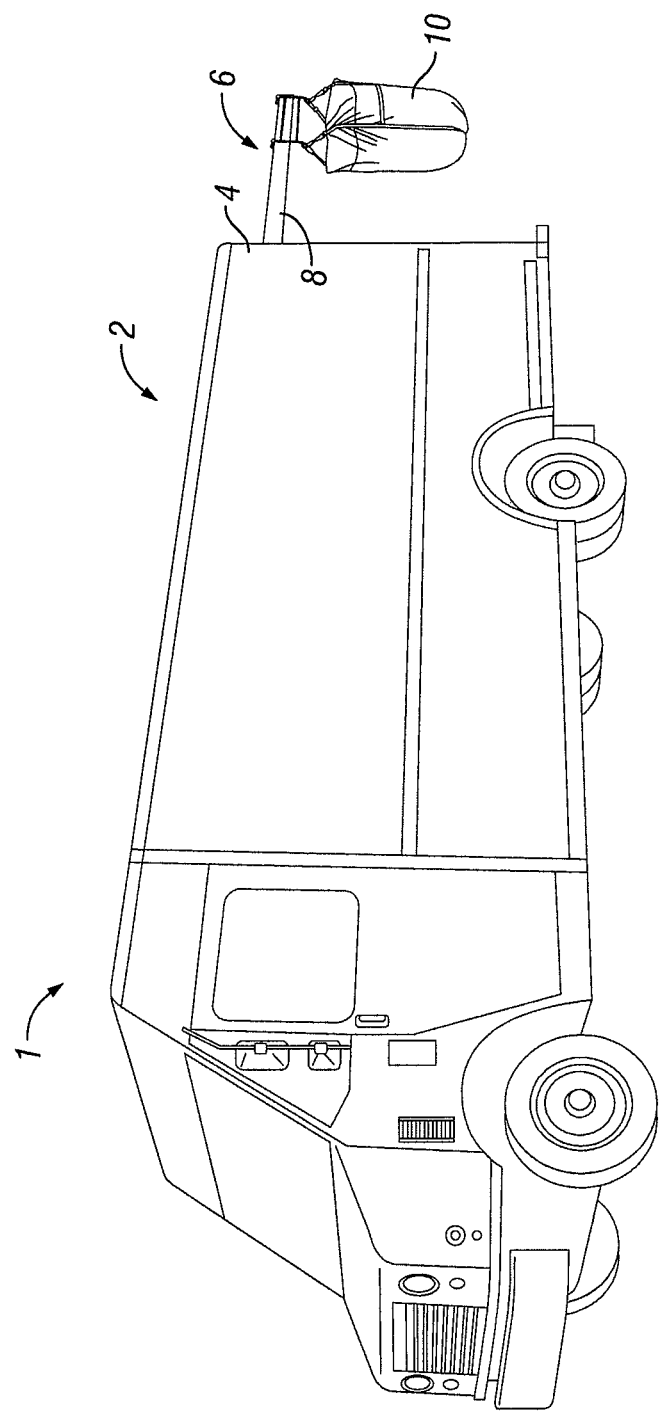
FIG. 1 is a perspective view of a delivery vehicle with a laundry bag suspended from a rail and extending from the rear of the vehicle.

A perspective view of a delivery vehicle 1 with a cargo area 2 is shown in FIG. 1. This view shows sidewall 4 with a sling bag rail system 6 attached thereto. A sling arm 8 is shown in the extended position exterior of vehicle 1 with a sling bag 10 suspended from the rail 8. This view demonstrates how easy it is with the sling bag suspended exterior of the truck for a container to be placed underneath to receive the bag's contents.

Figure 2:
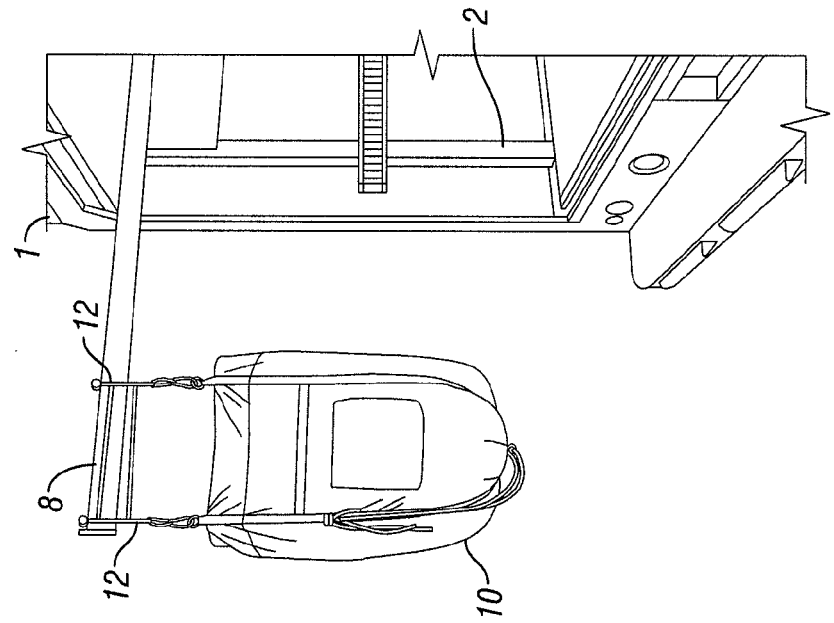
FIG. 2 is a perspective view of the rear portion of the vehicle of FIG. 1 showing a laundry bag suspended from a rail extending from the cargo area of that vehicle.

Another perspective view of the exterior of vehicle 1 with bag 10 suspending from rail 8 out of cargo area 2 is shown in FIG. 2. This view also shows the illustrative embodiment of hangers 12 that grasp straps 14 on sling bag 10 to suspend the bag 10 from rail 8. This view further shows a draw string 16 that slides a lock box to open and close the bottom of sling bag 10.

Figure 3:
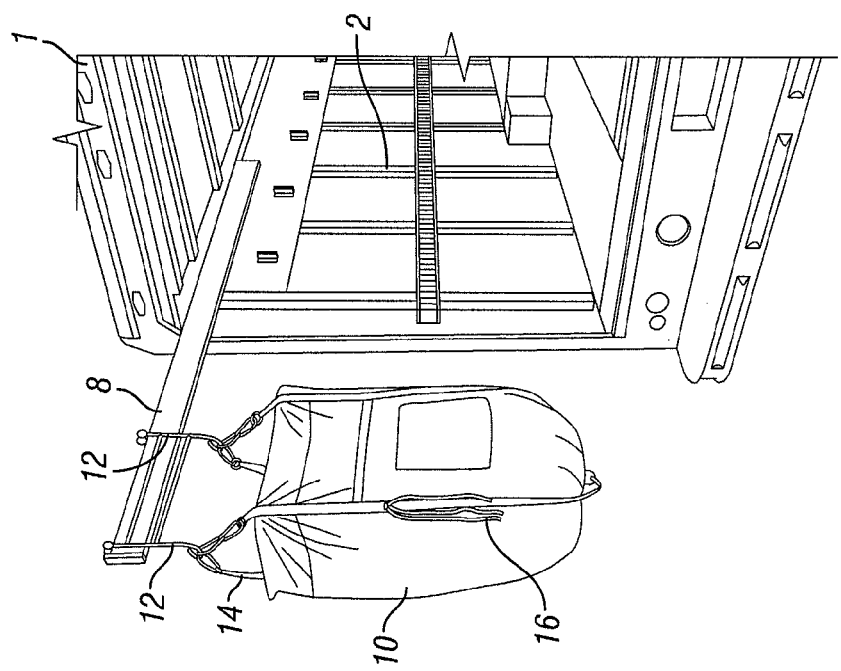
FIG. 3 is a side view of a laundry bag suspended from a rail extending from the rear of a cargo vehicle.
Figure 4:
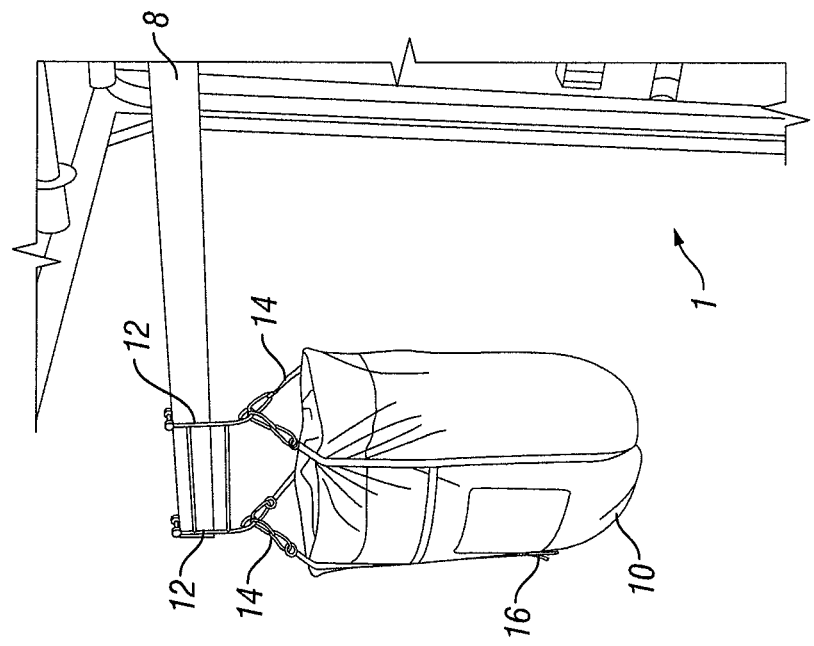
FIG. 4 is a perspective view of the laundry bag suspended from a rail and extending from the rear of the utility vehicle.

Side and perspective views of sling bag 10 suspended from rail 8 are shown in FIGS. 3 and 4. Again, these views demonstrate a utility of sling bag rail system 6. Rail 8 suspends sling bag 10 from the exterior of vehicle 1 and allows clearance underneath sling bag 10 so bag 10 may be emptied, also exterior of vehicle 1.

Figure 5:
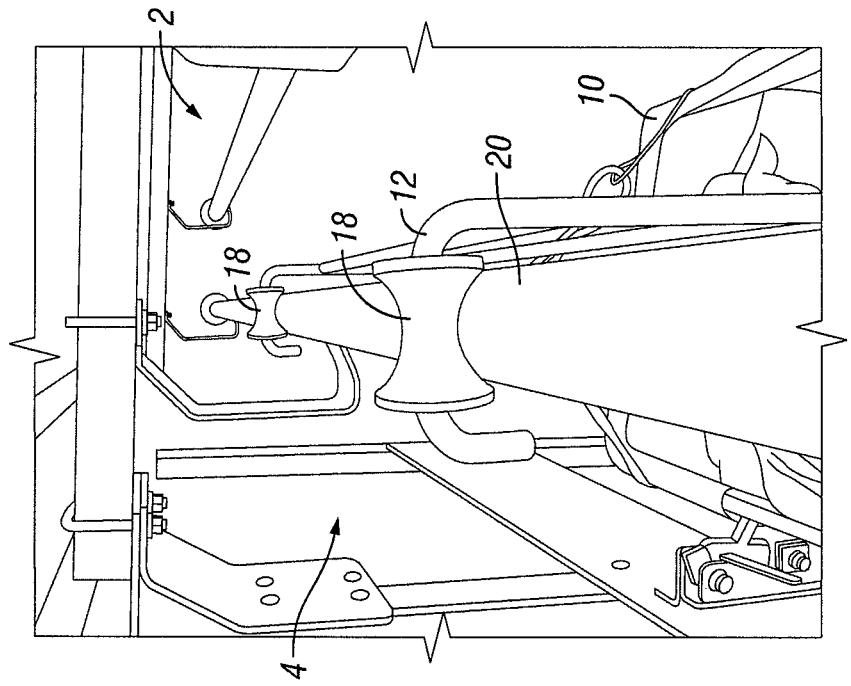
FIG. 5 is a detail view of a stationary rod positioned adjacent the sidewall of the interior of the cargo area of the vehicle of FIG. 1.

A detail view of stationary rod 20 positioned adjacent sidewall 4 inside cargo area 2 of vehicle 1 is shown in FIG. 5. This view shows hanger 12 suspending bags 10. Rollers 18, each rotating about a hanger 12 engages rail 20. This facilitates convenient rolling along rail 20 to move sling bag 10 to any variety of positions along the same.

Figure 6:
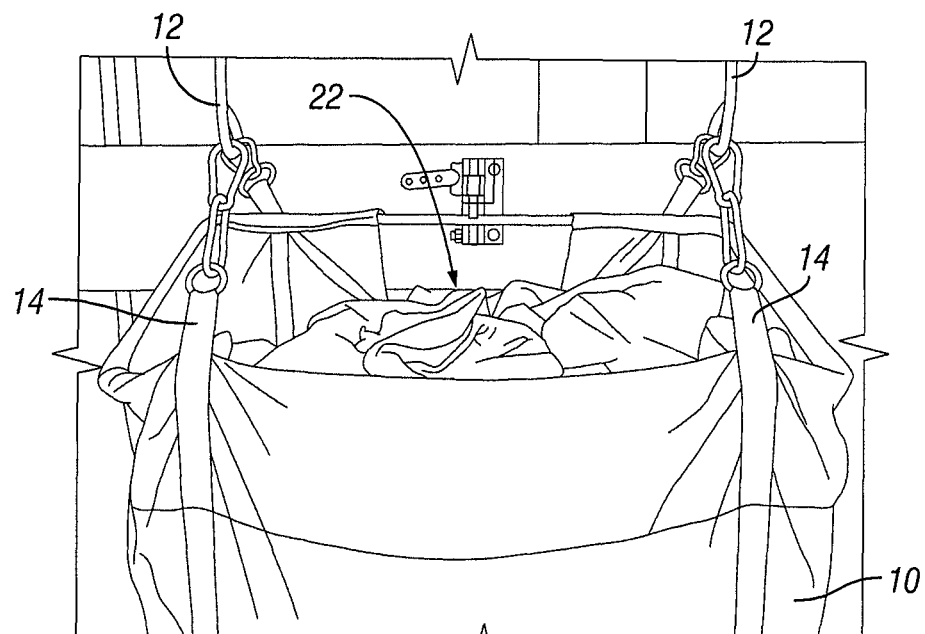
FIG. 6 is a front view of a sling bag hanging inside the cargo area of the vehicle of FIG. 1.
Figure 7:
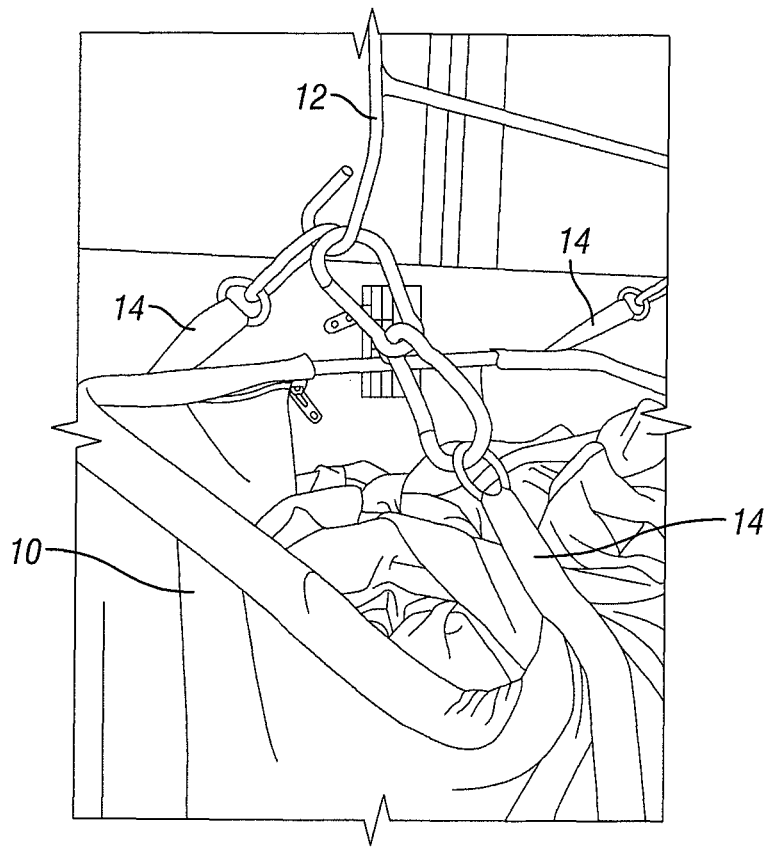
FIG. 7 is a perspective detail view of a portion of the sling bag suspended inside the cargo area of the vehicle of FIG. 1.
Figure 9:
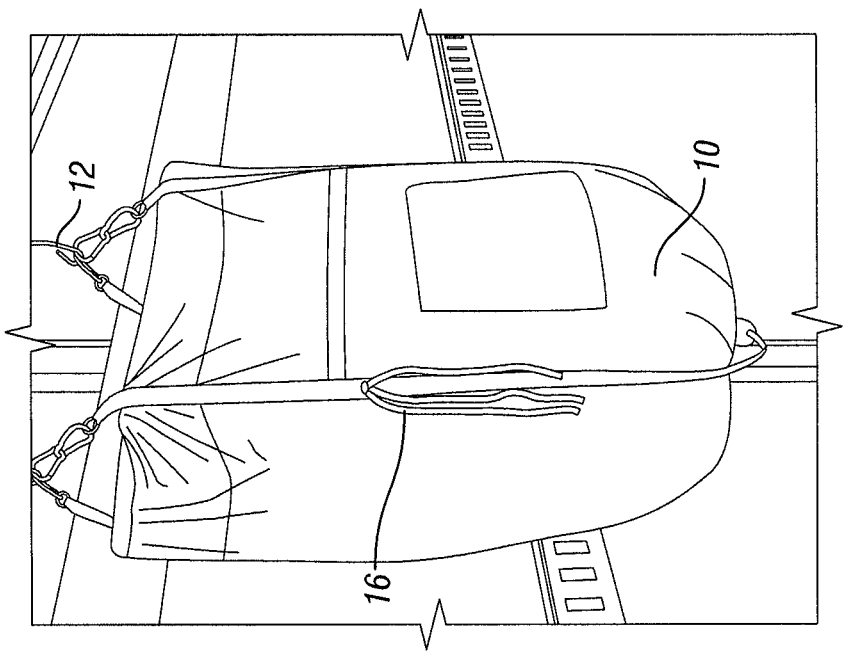
FIG. 9 is another perspective view of the sling bag hanging inside the cargo area of the vehicle of FIG. 1.
Figure 8:
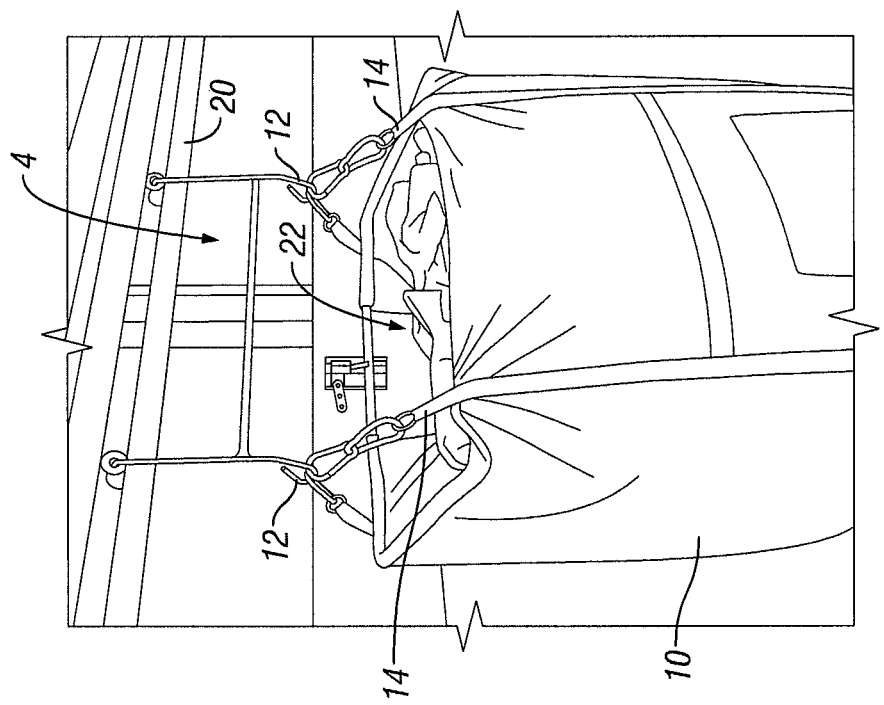
FIG. 8 is another perspective view of the sling bag hanging from the rail in the interior cargo area of the vehicle of FIG. 1.

The views shown in FIGS. 6-9 depict how hangers 12 couple with straps 14 to suspend sling bag 10. Opening 22, as shown in FIG. 6, demonstrates how laundry can be easily placed into sling bag 10. Indeed, FIGS. 7-9 show bags 10 full of laundry. In the illustrative embodiment, two hangers 12 hold each bag. It is appreciated, however, that more or fewer hangers can be used depending on the configuration of sling bag 10. It is appreciated that sling bag 10 can be modified as needed to accommodate different needs.

Figure 10:
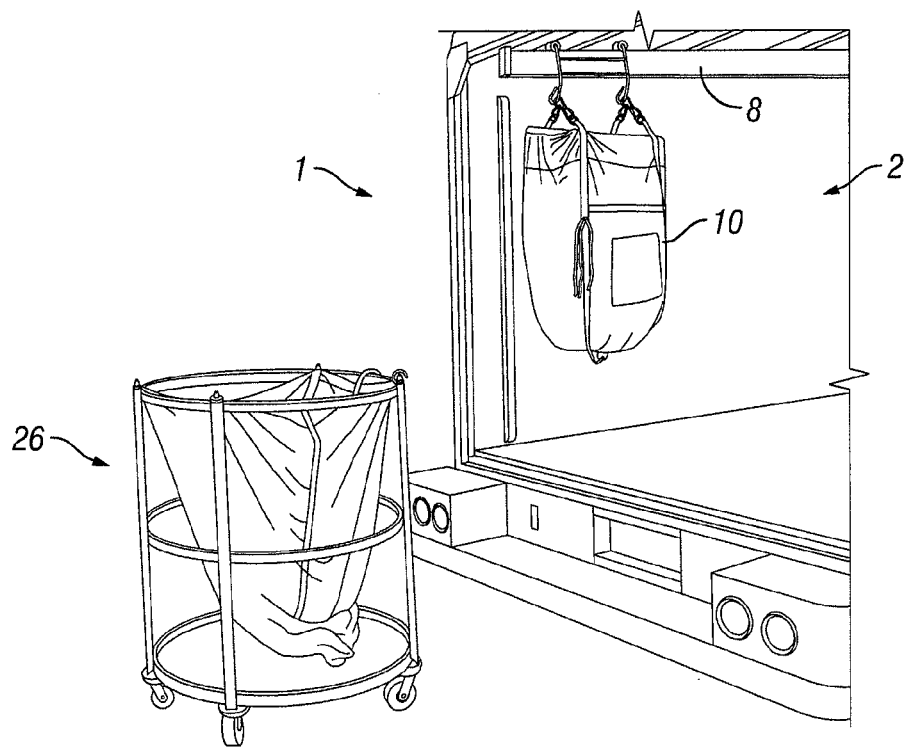
FIG. 10 is a perspective view of the rear end of the cargo vehicle of FIG. 1 with a bag extending therefrom and a cart that is rolled up to the rear of the vehicle to receive the contents of the bag.
Figure 11:
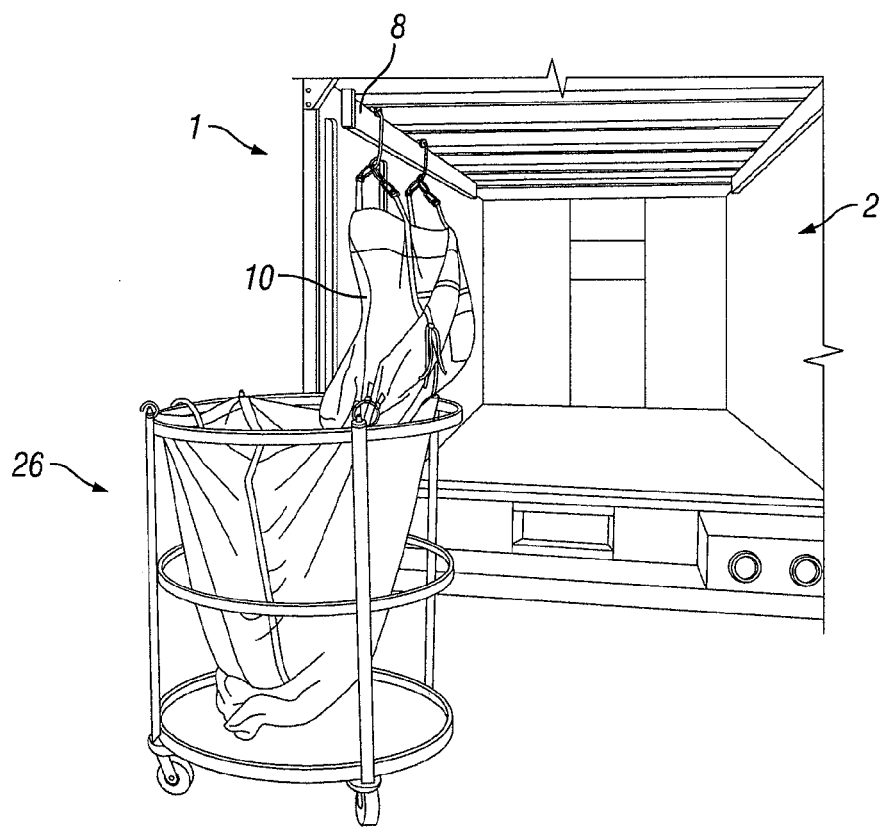
FIG. 11 is another perspective view of the rear of the cargo vehicle with a bag extending therefrom and emptying into the cart.

Perspective views of the rear end of cargo vehicle 1 are shown in FIGS. 10 and 11. These views depict how a laundry cart 26 can be rolled up to the end of the vehicle and receive the laundry dispensed from bag 10. The view shown in FIG. 10, for example, shows cart 26 rolled up to the end of vehicle 1. Bag 10 remains in cargo area 2 but in proximity of cart 26. The view in FIG. 11 shows how arm 8 can be extended and the contents of bag 10 can be emptied into cart 26 very easily. Because the cart 26 remains on the ground surface, it can be wheeled back to laundry or other desired facilities. It is contemplated that multiple bags can be hung inside cargo area 2 of vehicle 1 and different types of laundry may be sorted into the several bags. Each bag may then be slid out on rail 8 and dispensed in a separate cart 26. Dispensing sorted laundry directly from bags 10 to waiting carts below makes the laundry process more efficient.

Figure 12:
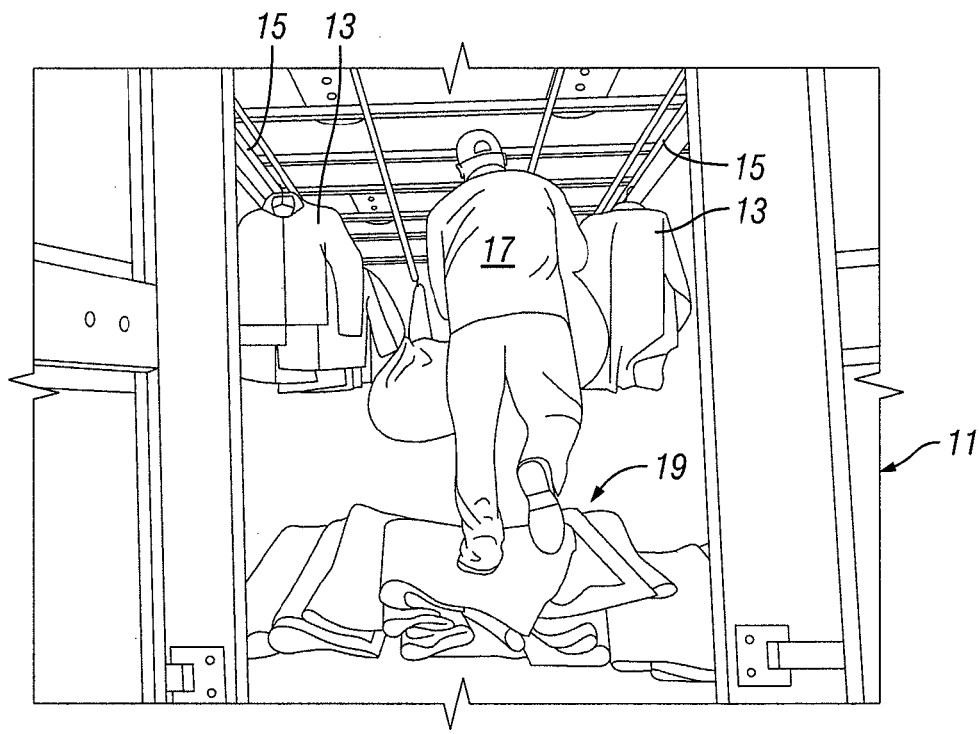
FIG. 12 is a rear view of a prior art cargo vehicle showing the interior of the cargo area and illustratively demonstrating how clean and soiled uniforms are managed in the cargo area.
Figure 13:
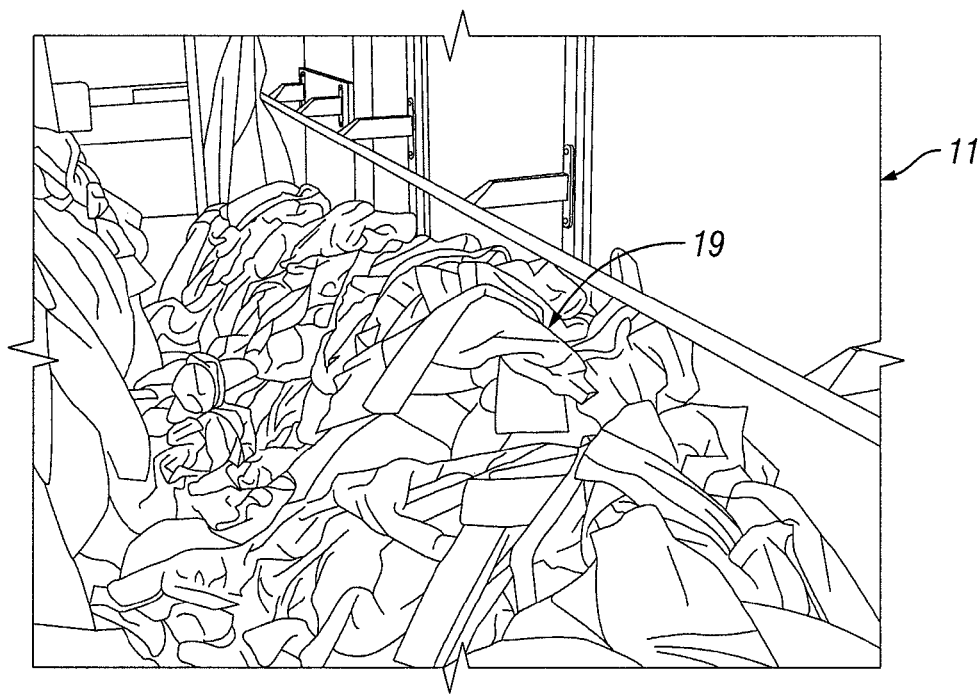
FIG. 13 is a perspective view of the interior of the prior art cargo area of the prior art vehicle demonstrating how soiled uniforms are piled therein.

FIGS. 12-15 show a prior art method for managing clean and soiled uniforms in a delivery vehicle. As shown in FIG. 12, clean laundry 13 may be hung from a stationary bar 15 in the cargo area of the truck 11. Soiled laundry is simply placed on the floor. This view accentuates the problem by demonstrating how an operator 17 must climb over the soiled laundry 19 in order to reach the clean uniforms 13. The view in FIG. 13 demonstrates how soiled laundry 19 piles up in the cargo area of the truck 11. Once all deliveries and pickups are made, the laundry needs to be hand-sorted and placed into containers outside of the vehicle.

Figure 14:
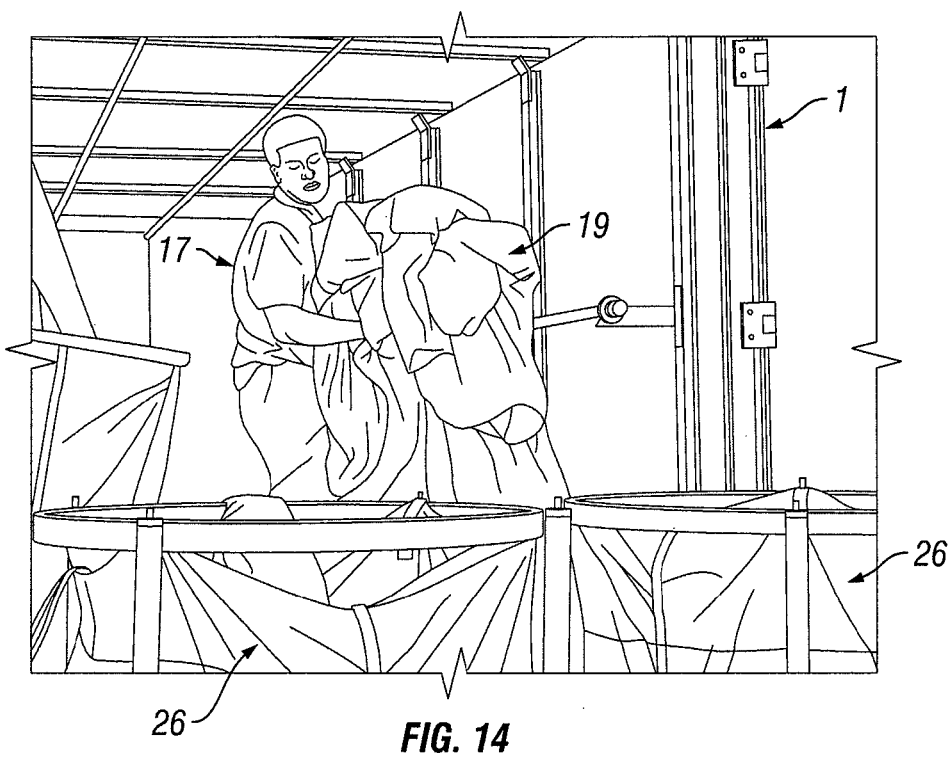
FIG. 14 is a perspective view of the rear of the cargo area of the prior art vehicle demonstrating how soiled laundry is removed from the cargo area.
Figure 15:
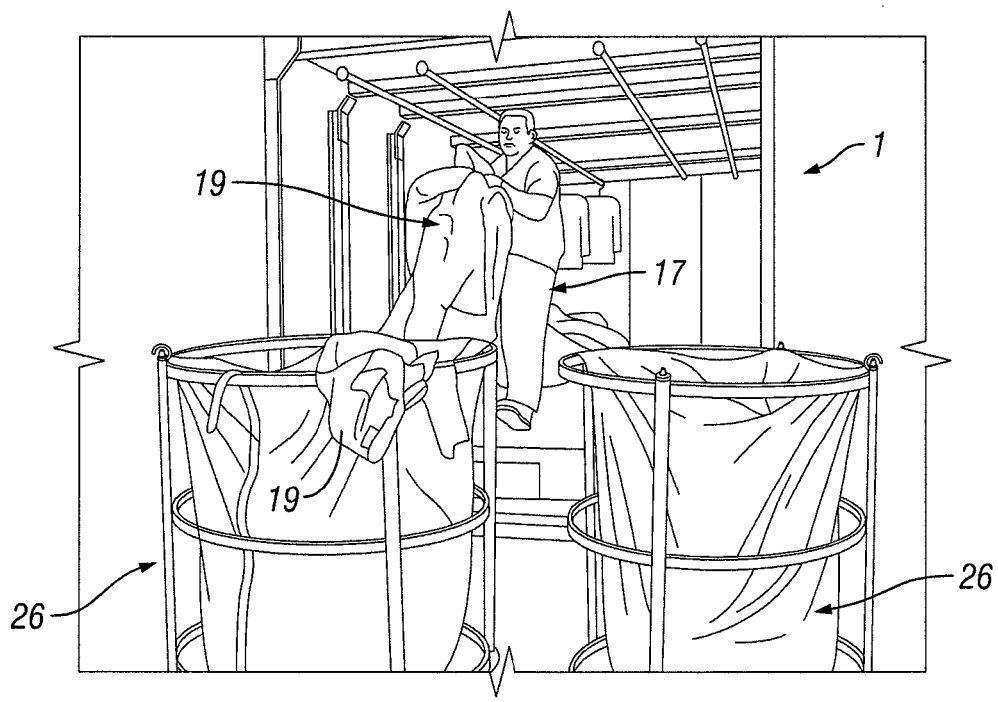
FIG. 15 is another perspective view of the rear of the cargo area of the prior art vehicle demonstrating how the soiled laundry is removed from the cargo area and placed into the carts on the ground level.

The view in FIGS. 14 and 15 further show how soiled laundry 19 is sorted and placed into containers 26 by operator 17 to be taken to laundry facilities. It is appreciated from these views that this process is labor intensive. It is also difficult to manage clean and soiled laundry inside the same vehicle.

Figure 16:
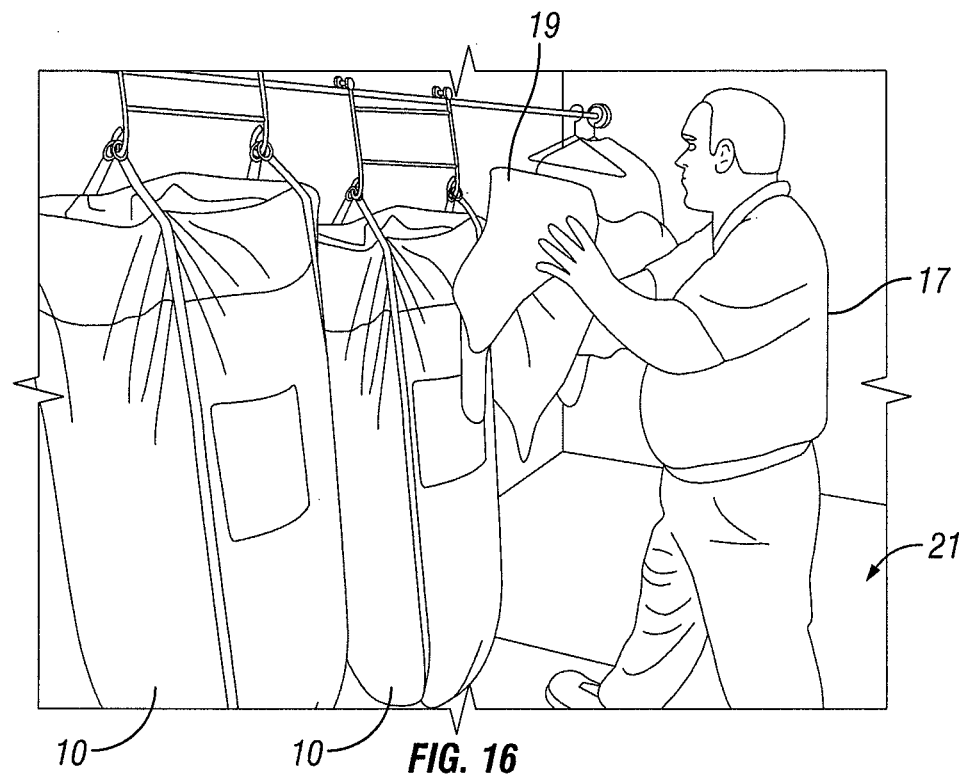
FIG. 16 is a perspective view of the interior of the cargo area of the vehicle demonstrating how soiled laundry may instead be organized and stored in hanging sling bags.
Figure 17:
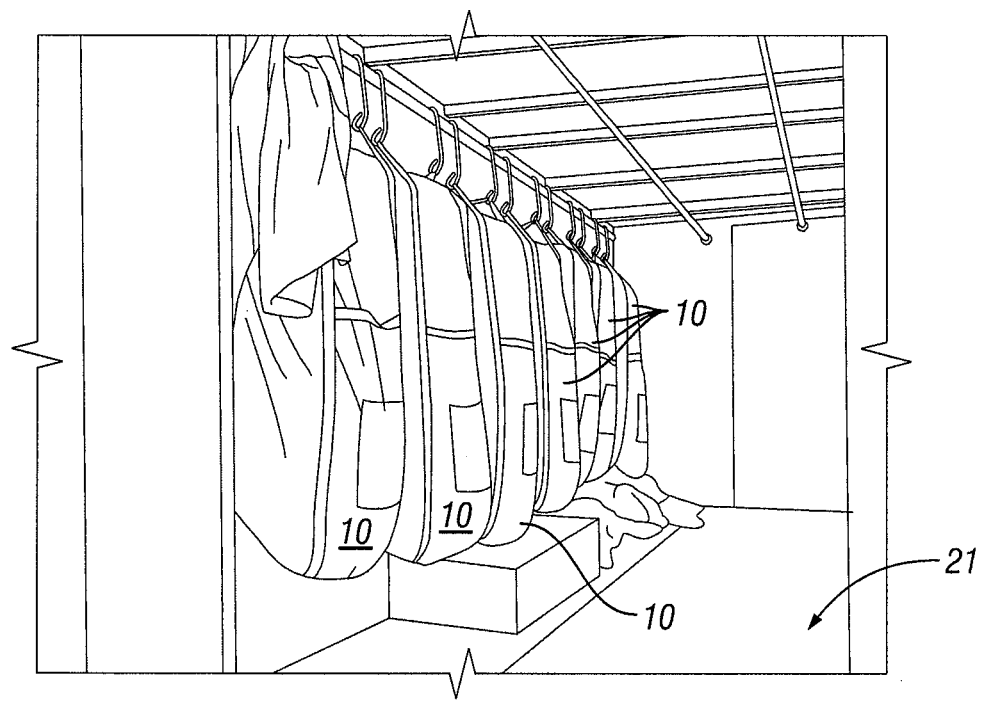
FIG. 17 is another perspective view of the interior of the vehicle demonstrating how laundry can be stored inside the hanging sling bags in contrast to the storage method shown in the prior art of FIGS. 12 and 13, for example.

In contrast, FIGS. 16-19 show how clean garments and soiled laundry can be better managed inside the vehicle by using the disclosed system. As shown in FIG. 16, sling bags 10 can be lined along one side of the cargo area with clean uniforms or other garments hung from the other side. (See, e.g., clean clothes 13 in FIG. 12.) The aisle 21 is kept clear and the plurality of bags 10 make sorting the soiled laundry 19 by operator 17 possible right at pickup, instead of waiting until the soiled laundry is delivered to the laundry facilities. The view in FIG. 17 shows how sling bags 10 can be filled up with each bag designated for a particular type of soiled laundry. Again, presorting the uniforms before reaching the laundry facility saves time and cost. FIGS. 18 and 19, like FIGS. 3 and 11, demonstrate how sling bag 10 may extend from the exterior of vehicle 1 on rail 8 and then open to dispense the laundry into the cart 26.

Figure 21:
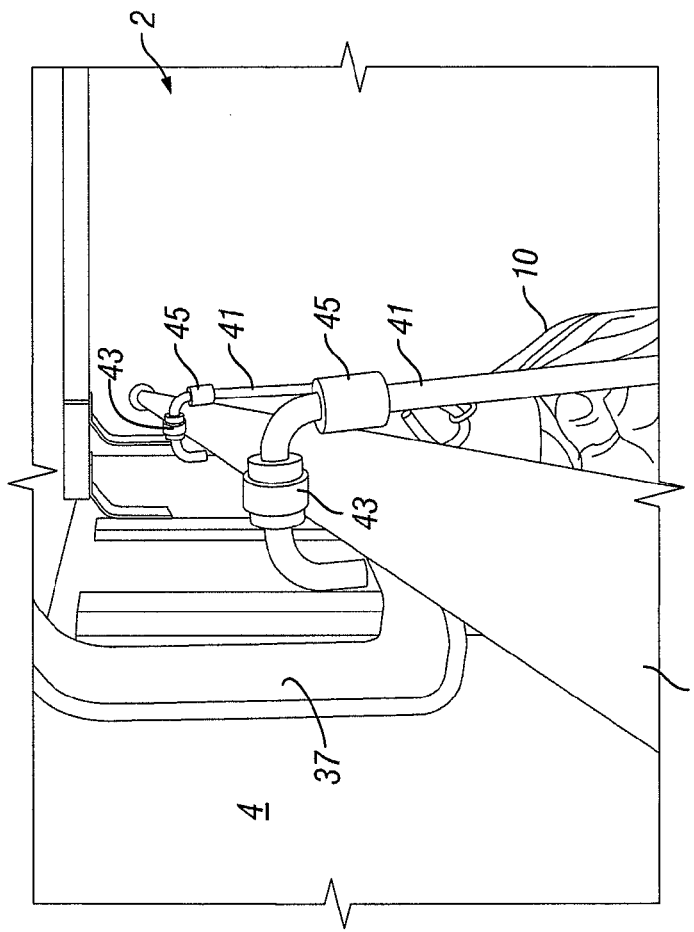
FIG. 21 is another perspective view from inside the cargo area looking towards the front of the vehicle and showing the sling bag suspended from the stationary rail inside the cargo area.
Figure 20:
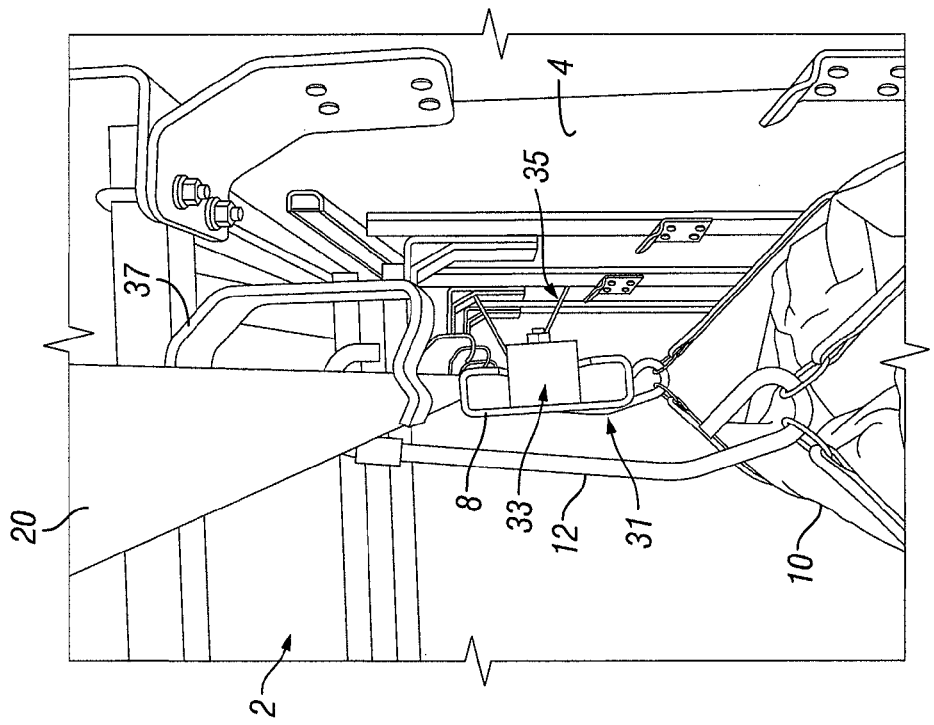
FIG. 20 is a perspective view from inside the cargo area of the vehicle looking towards the rear of the vehicle showing a sling bag suspended from the stationary rail inside the cargo area.

FIGS. 20 and 21 show sling bag 10 coupled to the stationary rail with the moveable sling bag rail assembly attached underneath to the sidewall of the vehicle via brackets. The view in FIG. 20 shows rail assembly 31 which includes rail 8 movably coupled to bar 33 which is self-coupled to bracket 35 shown herein and attached to sidewall 4. It is appreciated that assembly 31 is held away from sidewall 4 so that sling bag 10 can be suspended from assembly 31 without interference of sidewall 4. Bar 20 also receives hanger 12 is illustratively shown suspended in cargo area 2 via bracket 37. It is appreciated that bracket, such as 37 and other designs, can be attached to either the ceiling or wall portions of the cargo area 2. The view shown in FIG. 21 includes hangers 41 and gaging rail 20. In this illustrative embodiment, hangers 41 still hold bag 10. Rollers 43 and 45 on hangers 41 assist moving hangers 41 along rail or bar 20.

Figure 22:
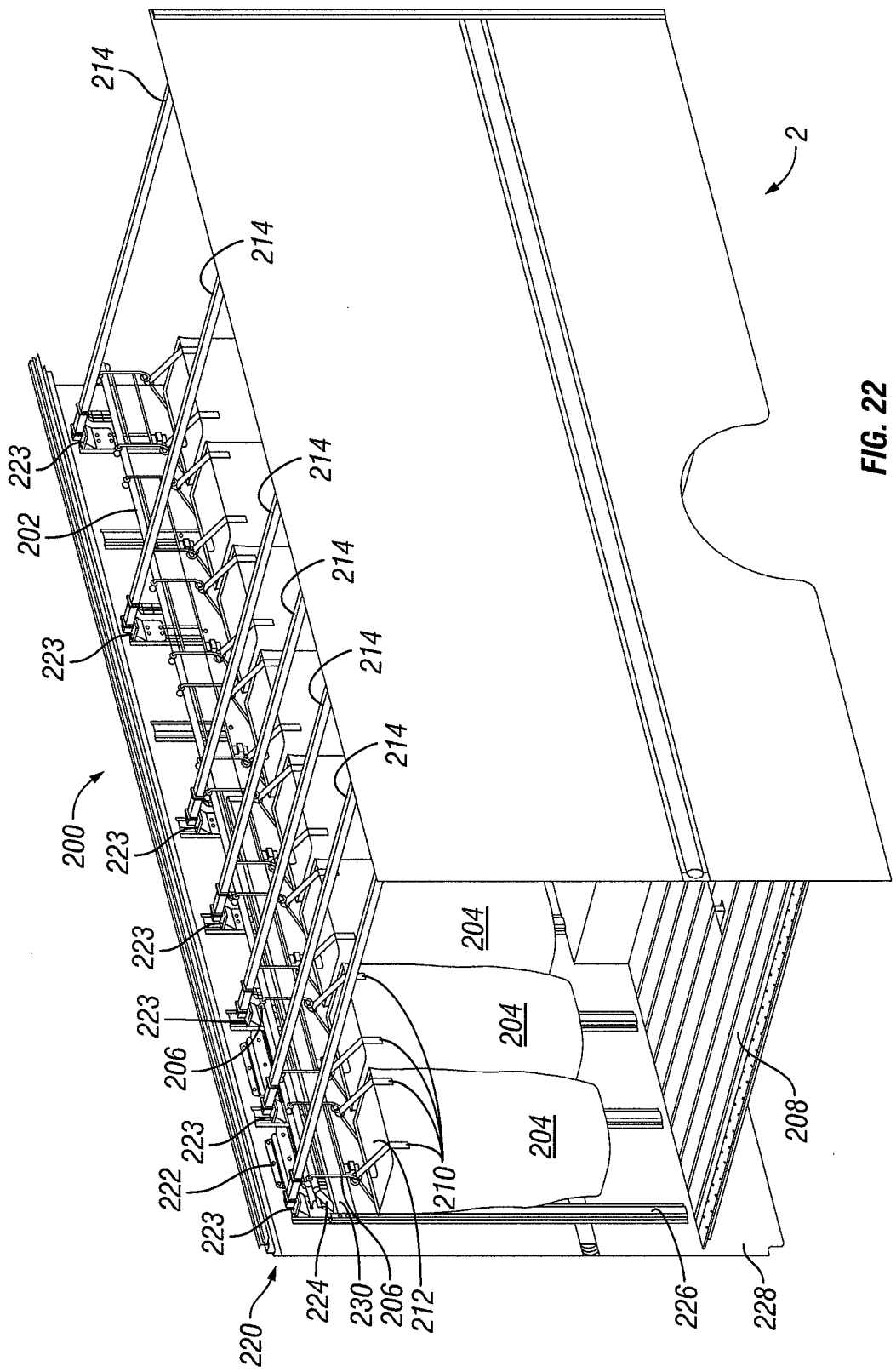
FIG. 22 is a perspective view of the cargo area of a delivery vehicle with its roof and back door removed depicting an illustrative embodiment of a sling bag rail assembly.

A perspective view of cargo area 2 of a delivery vehicle 1 with roof and back door removed depicting another illustrative embodiment of a sling bag rail system 200 is shown in FIG. 22. This embodiment includes a laundry rail 202 that illustratively extends from about one end of the cargo area to the other. Rail 202 supports laundry sling bags 204 and allows them to be stored side-by-side along rail 202 to hold and unload soiled laundry inside into a container on the ground surface, such as container 26 shown in FIG. 10. In this illustrative embodiment, each sling bag 204 includes two hangers 206 that suspend bags 204 over the interior floor 208 of cargo area 2. In addition, hangers 206 attach to straps 210 that assist maintaining an opening 212 to receive the soiled laundry. As shown herein, a plurality of sling bags 204 may be lined-up on rail 202 to provide a system for sorting and storing the soiled laundry during transport. Cross bars 214 illustratively assist supporting rail 202 and sliding rail assembly 220. Bracket 222 attaches sliding rail assembly 220 to wall 228. A transition member 224 is illustratively located at the end of rail 202 so hangers 206 can slide from rail 202 onto rail assembly 220. Also shown are sidewall studs 226 that are attached to, or formed on sidewall 228, to support brackets 222 (and 225, see FIG. 29), 223 and/or wall 228. It is appreciated that studs 226 may assist in better supporting the weight created by the rail assemblies, sling bags, and laundry.

Figure 23:
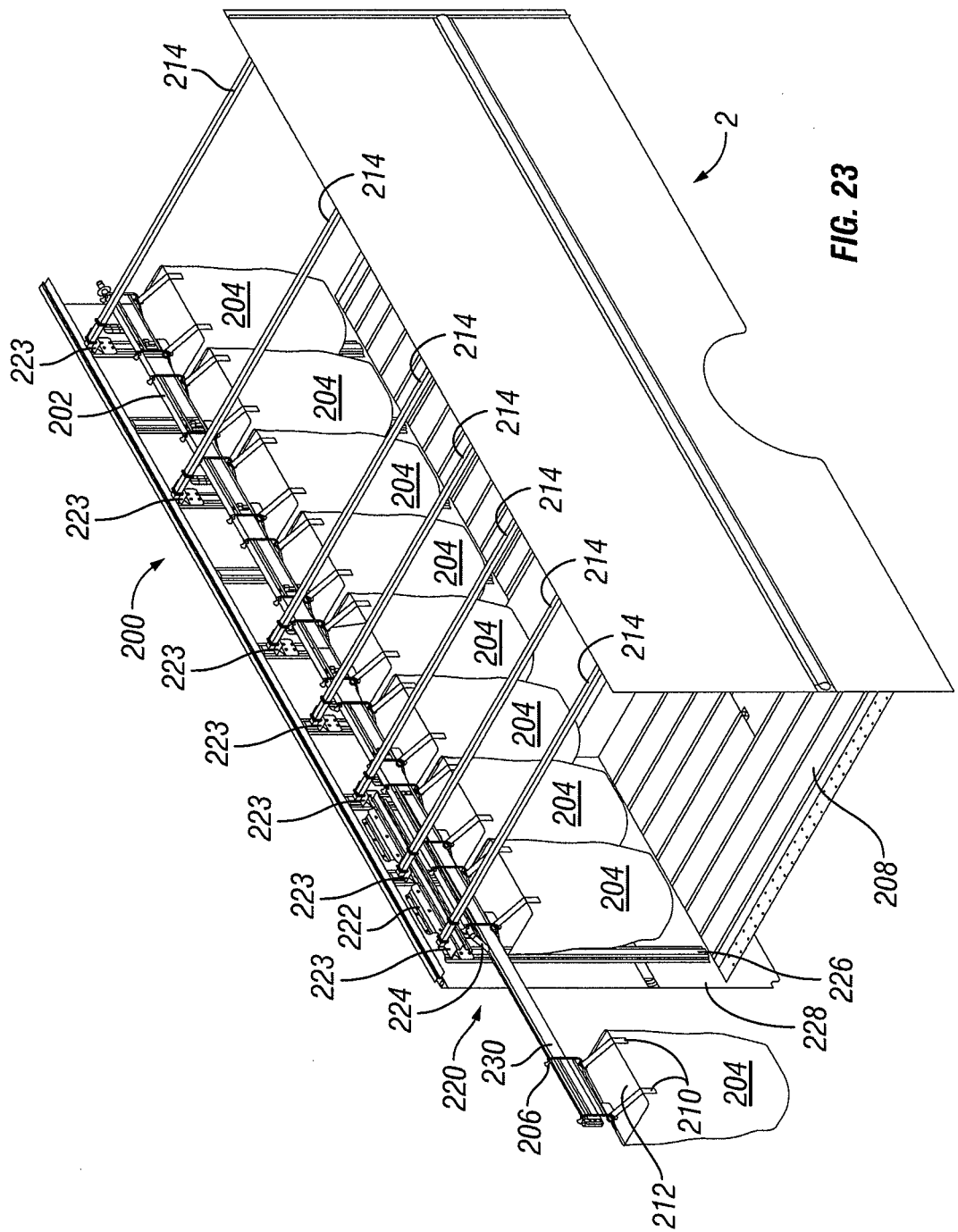
FIG. 23 is another perspective view of the cargo area with the roof and back door removed.

Another perspective view of cargo area 2 with the roof and back door removed is shown in FIG. 23. Sliding rail 230 is shown extended from the rear end of cargo area 2 and configured to hold sling bag 204 via hangers 206 outside of cargo area 2 similar to that shown in the prior embodiment. By sliding bag 204 to the exterior of cargo area 2, it is available to be opened to dispense laundry into another container. Brackets 223 couple to cross bars 214 which assist holding rail 202 spaced apart from sidewall 228.

Figure 24:
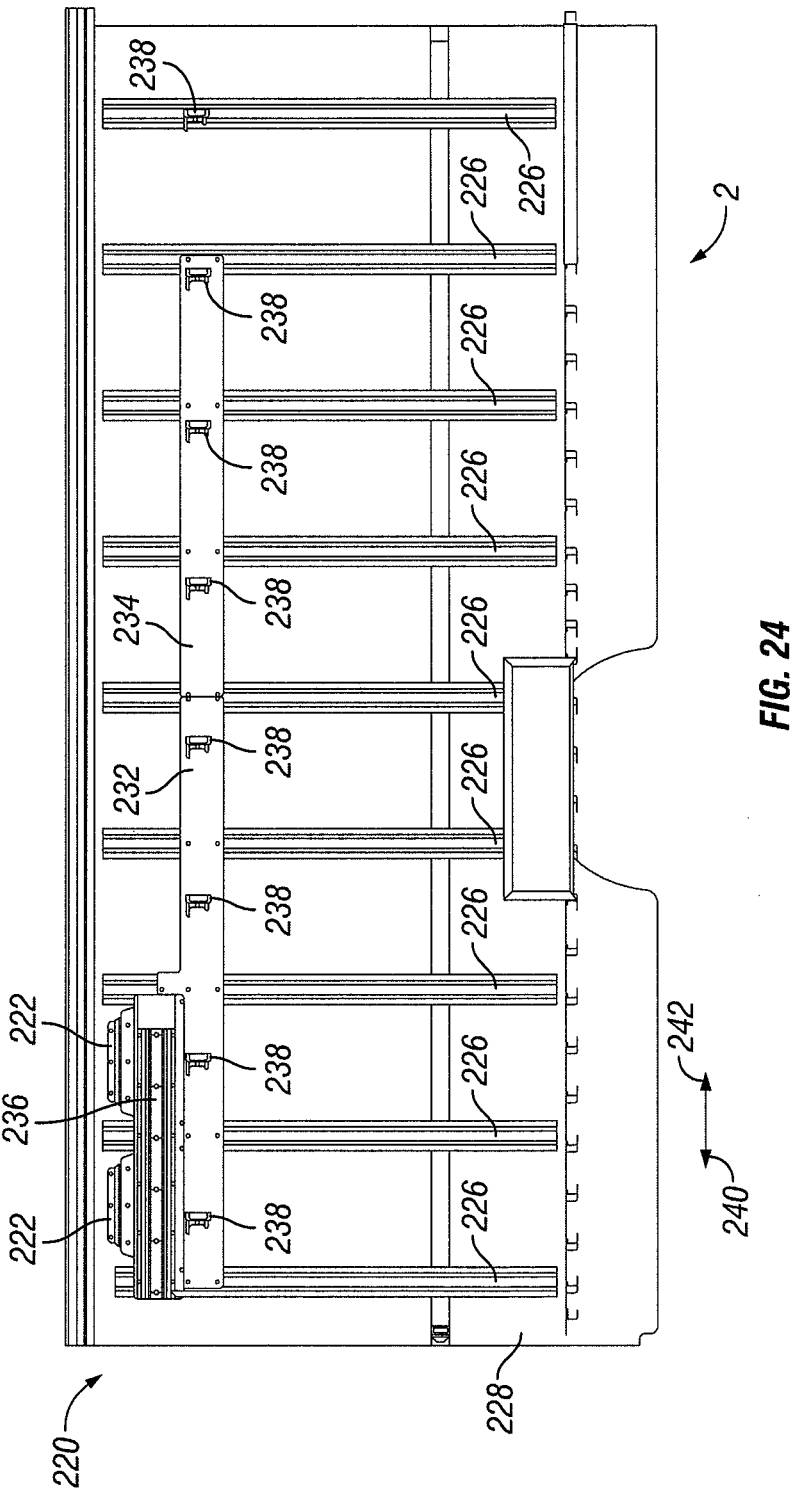
FIG. 24 is a side view of the sidewall portion of the cargo vehicle showing an illustrative embodiment of the sling bag rail assembly.

Isolated side views of wall 228 of cargo area 2 with sliding rail assembly 220 attached thereto are shown in FIGS. 24-28. As shown in FIG. 24, for example, latch brackets 232 and 234 are fastened to wall studs 226. It is appreciated that brackets 232 and 234 can be multiple or monolithic brackets depending on the particular needs. In addition, it is appreciated that brackets 232 and 234 may be attached to the vehicle wall directly or other similar structures as long as the wall or other structure can support the weight and forces brackets 232 and 234 are subjected to. A guiderail 236 is attached to wall 228 via brackets 222 (and 225, see FIG. 29). It is appreciated that bracket 222 may be a single bracket or part of a multi-bracket system attached to wall 228 or studs 226. This view also shows bag latches 238 that are selectively attachable to sling bag 204 to limit their movement inside the vehicle. For example, inertia created by accelerating and decelerating the vehicle may cause bags 204 to tend to continue moving in one direction or another. This may put substantial stress on rail 202 and/or cause bags to fall therefrom. Attaching bags to latch 238 reduces the risk of this happening.

Figure 25:
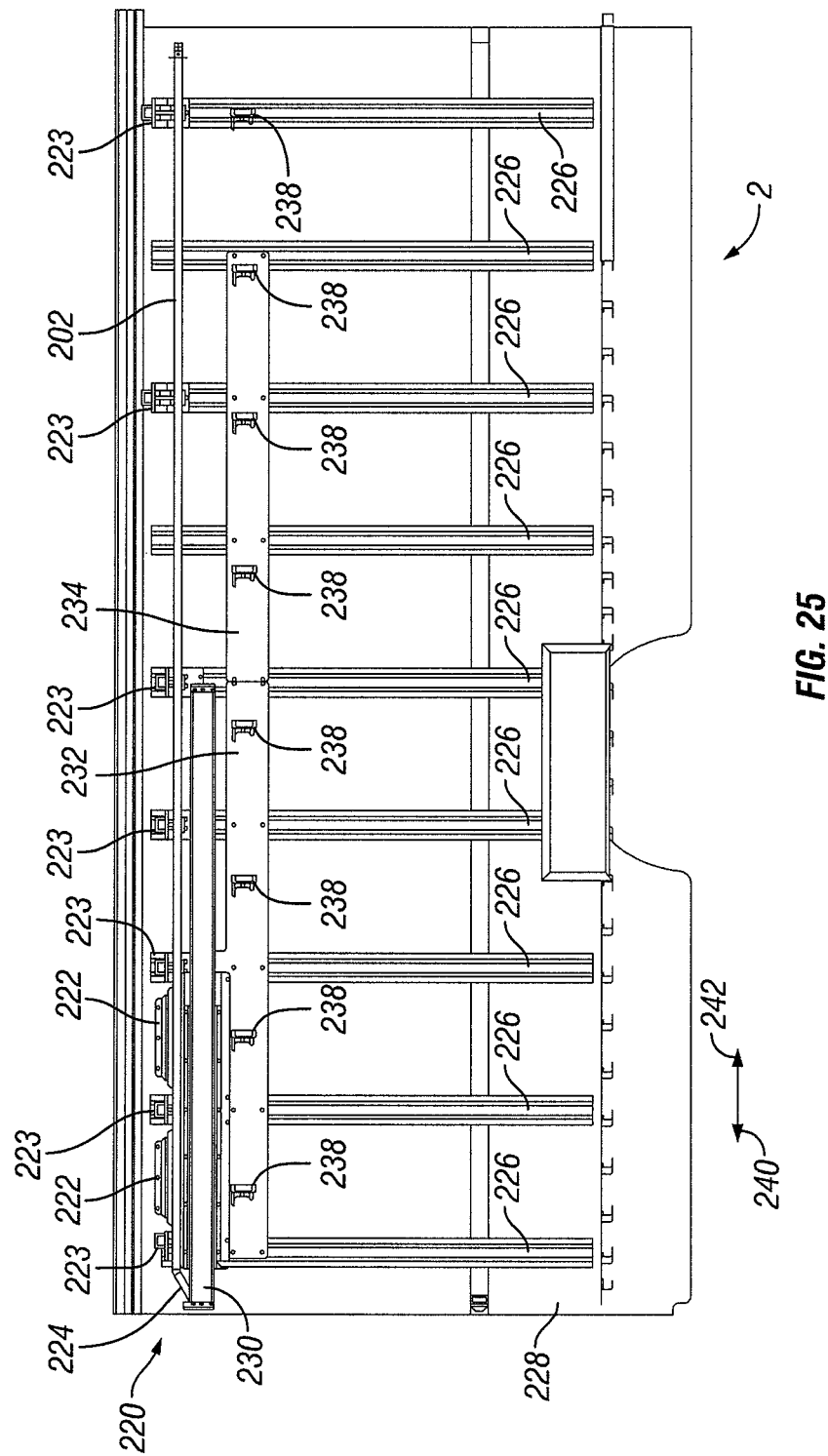
FIG. 25 is another side view of the vehicle cargo area sidewall with the embodiment of the sling bag rail assembly attached thereto.

Sidewall 228 shown in FIG. 25 is similar to that shown in FIG. 24 with the exception of rail 202 attached to wall studs 226 via bracket 223 and sliding rail 230 coupled to guiderail 236. Also shown is transition member 224 attached to the end of rail 202 adjacent the end of cargo area 2. This view also shows brackets 232 and 234 attached to wall studs 226 similar to that shown in FIG. 42. It is noted, however, that latch 238 can not only be attached to brackets 232 and 234, but can alternatively be attached directly to wall studs 226.

Figure 26:
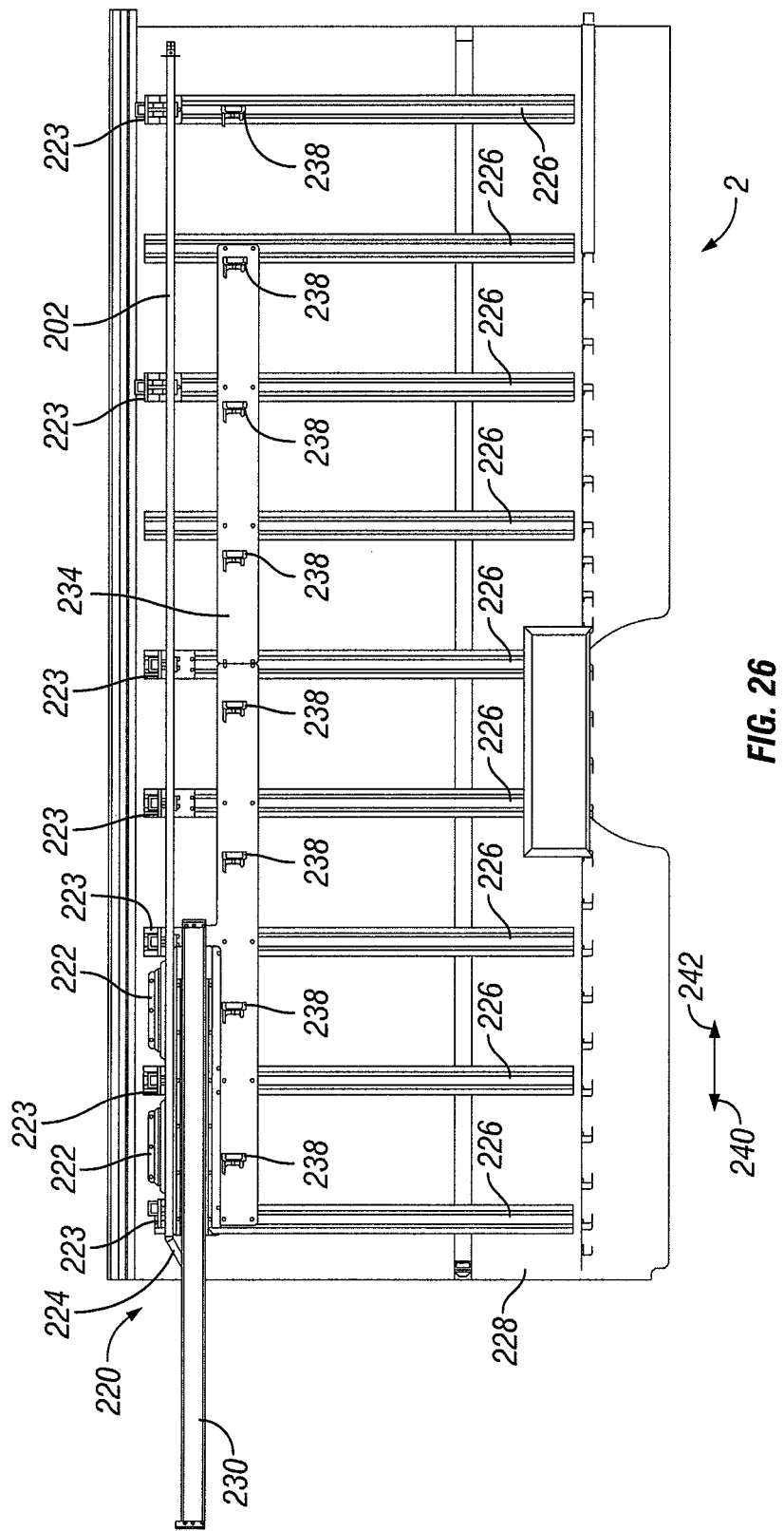
FIG. 26 is another side view of the sidewall portion of the cargo area of the vehicle showing the sling bag rail assembly with its sliding rail extended beyond the rear of the side wall.
Figure 27:
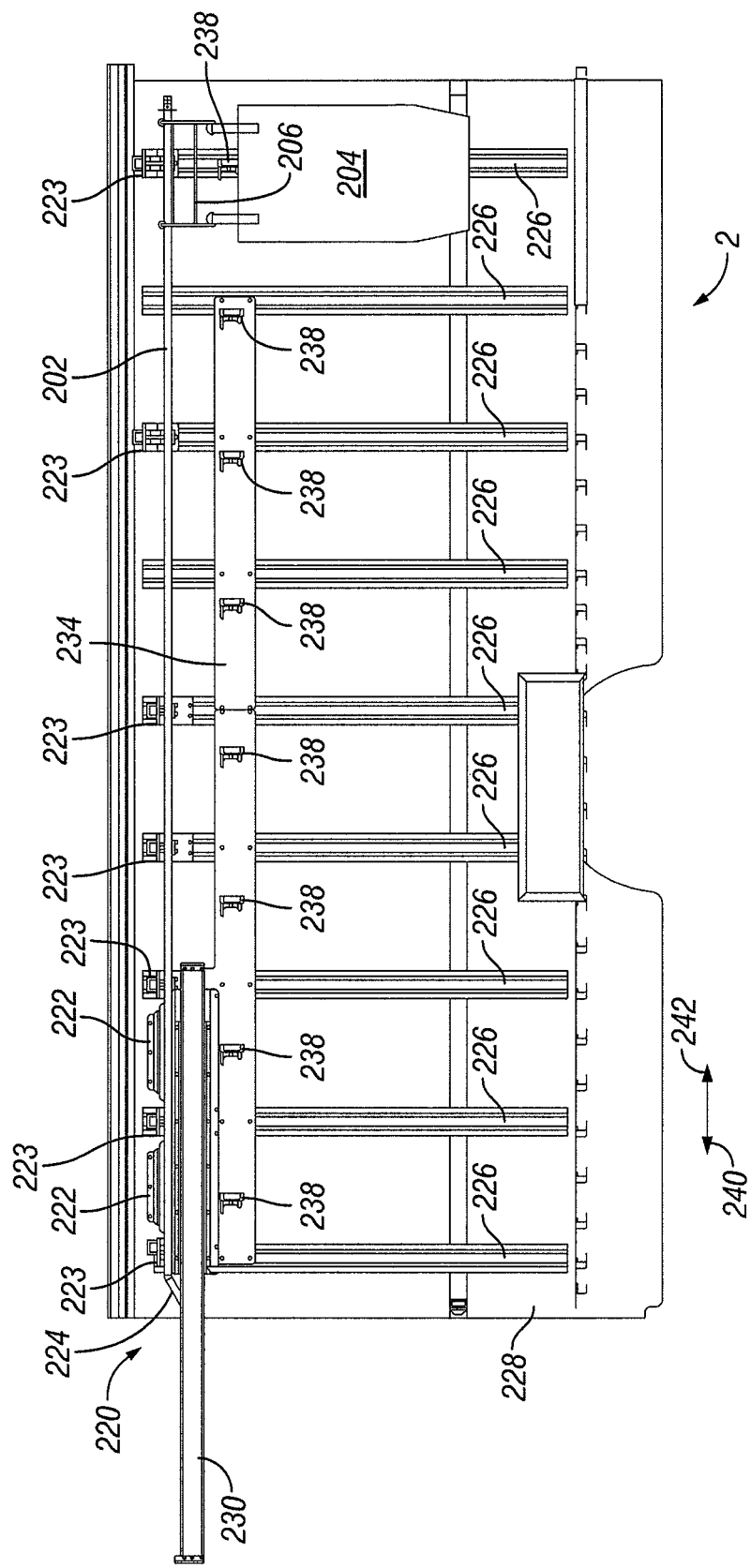
FIG. 27 is another side view of the sidewall of the cargo area of the vehicle showing the sling bag rail assembly with the slide rail extended and a bag hanging on the stationary bar portion.
Figure 28:
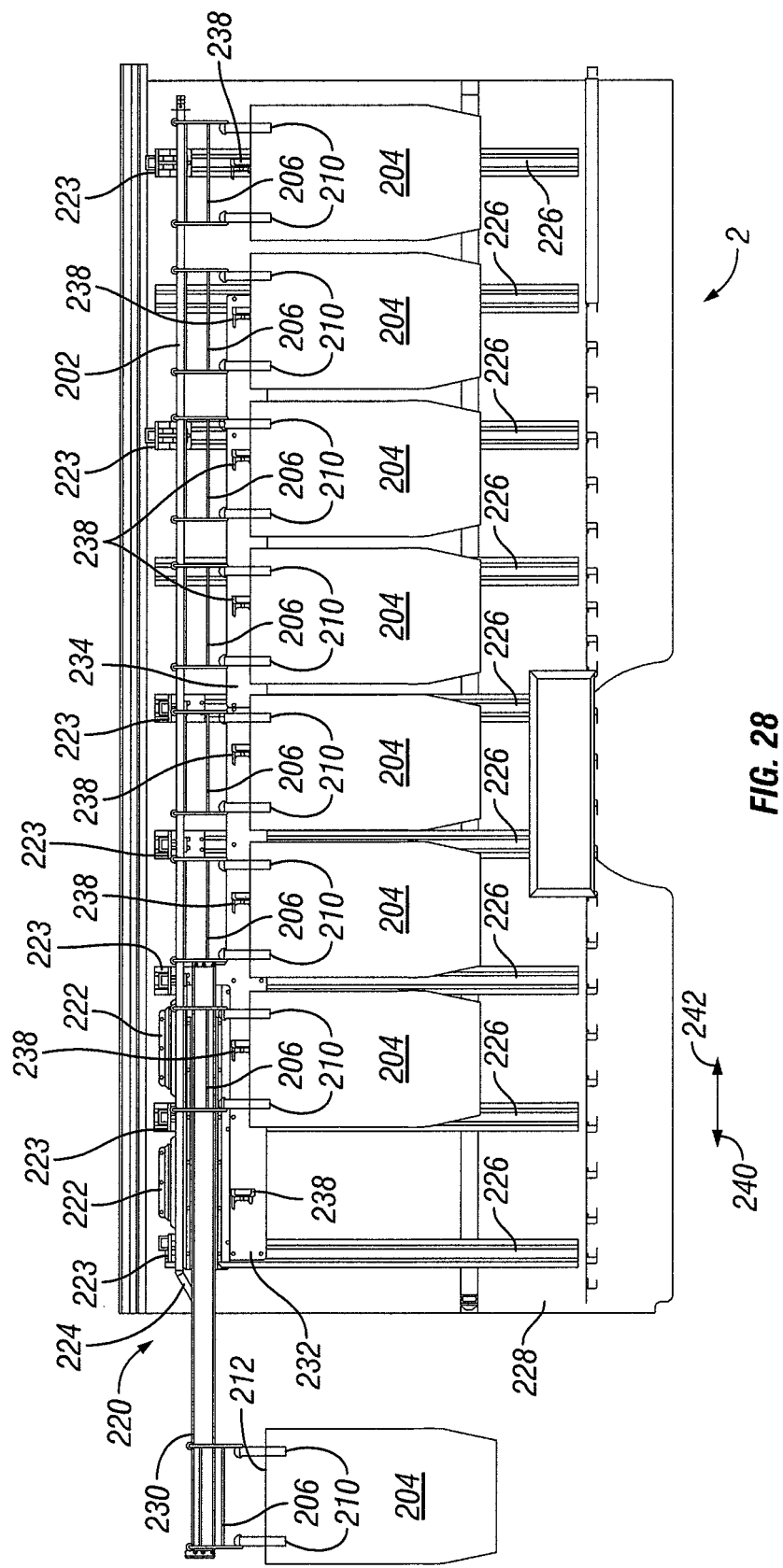
FIG. 28 is another side view of the sidewall portion of the cargo area of the vehicle demonstrating how bags can be hung on the stationary rail and then moved to the sliding rail and suspended from the sliding rail exterior of the cargo area.

It is apparent from this view how sliding rail 230 can move parallel to rail 202 in directions 240 and 242 from its recessed position shown herein inside cargo area 2 and its extended position exterior of the vehicle, as shown in FIGS. 26 through 28. Extending rail 230 allows sling bag 204 to be suspended over the ground surface exterior of the cargo vehicle. As shown herein, sliding rail 230 sits underneath rail 202 and out of the way of sling bags 204 while it is not in use. Sliding rail 230 does not interfere with latches 238 or hangers 206 on bag 204. This view demonstrates the utility of transition member 224. Hooks 206 slide bags 204 from the upper rail 202 to the lower rail 230. Transition piece 224 provides a rail surface between these different heights to effectuate smooth transitioning from one rail to another. It is appreciated that transition piece 224 can be modified depending on the location of the slide rail 230 relative to rail 202.

The side view of wall 228 shown in FIG. 26 is similar to that of FIG. 25 except that sliding rail 230 has been moved in direction 240 to extend beyond wall 228. The view of wall 228 shown in FIG. 27 is the same as that shown in FIG. 26 except with sling bag 204 being suspended from rail 202 via hangers 206. Once bag 204 is unlatched from latch 238, it can be slid in direction 240 along rail 202, over transition member 224 and onto sliding rail 230. It is appreciated that although the side profiles of rails 230 and 202 are shown different, they are both sized to accommodate hangers 206. The view of wall 228 in FIG. 28 is likewise similar to that of FIGS. 26 and 27 except that in this case sling bag 204 has moved across rail 202 down transition member 224 and onto sliding rail 230. Additional sling bags 204 are suspended on rod 202 via hangers 206 ready to be filled with laundry and then moved to sliding rail 230 to be emptied outside of cargo area 2.

Figure 29:
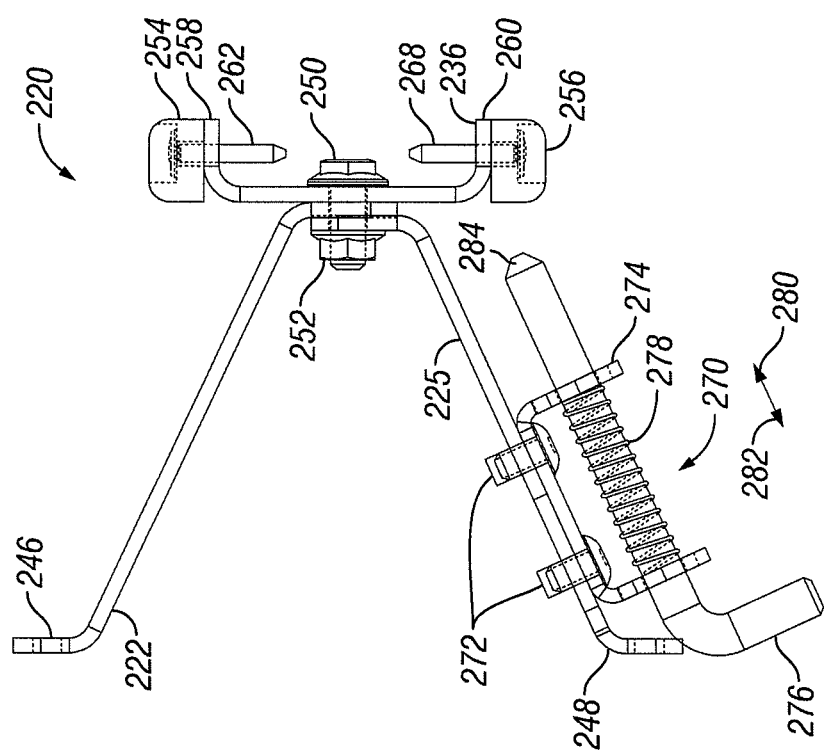
FIG. 29 is an end view of an illustrative embodiment of a portion of a sling bag rail assembly.

An end view of a portion of slide rail assembly 220 is shown in FIG. 29. Bracket 222 is coupled to a complementary bracket 225 and both fastened to vehicle wall 228 via fasteners that extend through bores 246 and 248, respectively. Brackets 222 and 225 are also illustratively attached together via flange bolt 250 and locking nut 252. It is appreciated however, that other like fasteners can be used to attach brackets 222 and 225 together. In this illustrative embodiment, bolt 250 attaches guiderail 236 to brackets 222 and 225 as well. Guiderail 236 is illustratively a C-shaped rail providing upper and lower surfaces that receive bearings or other like structures that assist in making sliding rail 230 slide in and out of cargo area 2. In the embodiment shown, upper and lower bearing surfaces 254 and 256 are attached to upper and lower portions of guiderail 236, respectively, via fasteners 262 and 268. It is appreciated that bearing surfaces 254 and 256 may be made from ultra high molecular weight polyethylene or other bearing material and/or configuration. Other bearings such as rollers can be used in alternative embodiments.

In one illustrative embodiment, a spring latch assembly 270 is attached to bracket 225 via bolts 272. Spring latch 270 includes an illustrative U-shaped bracket 274 with handle 276 extending therethrough as illustratively shown. A spring 278 is illustratively wrapped around handle 276 to bias tip end 284 of handle 276 in direction 280. Latch 270 serves as a barrier to sliding rail 230 holding it in place. (See, also, FIG. 31.)

Figure 30:
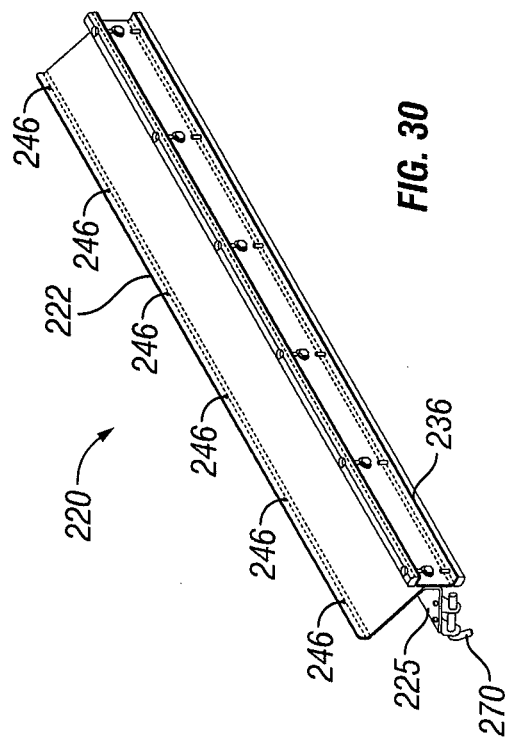
FIG. 30 is a perspective view of a portion of the sling bag rail assembly.

A perspective view of sliding rail assembly 220 (with sliding rail 230 removed) is shown in FIG. 30. In this embodiment, bracket 222 is a single longitudinally extending piece with holes 246 spaced adjacent the top edge thereof to secure to wall 228 of cargo area 2. This view also demonstrates how brackets 222 and 225 extend guiderail 236 away from vehicle wall 228. Latch assembly 270 is illustratively placed adjacent the end of guiderail 225 so it can engage sliding rail 230, thereby preventing sliding rail 230 from moving.

Figure 31:
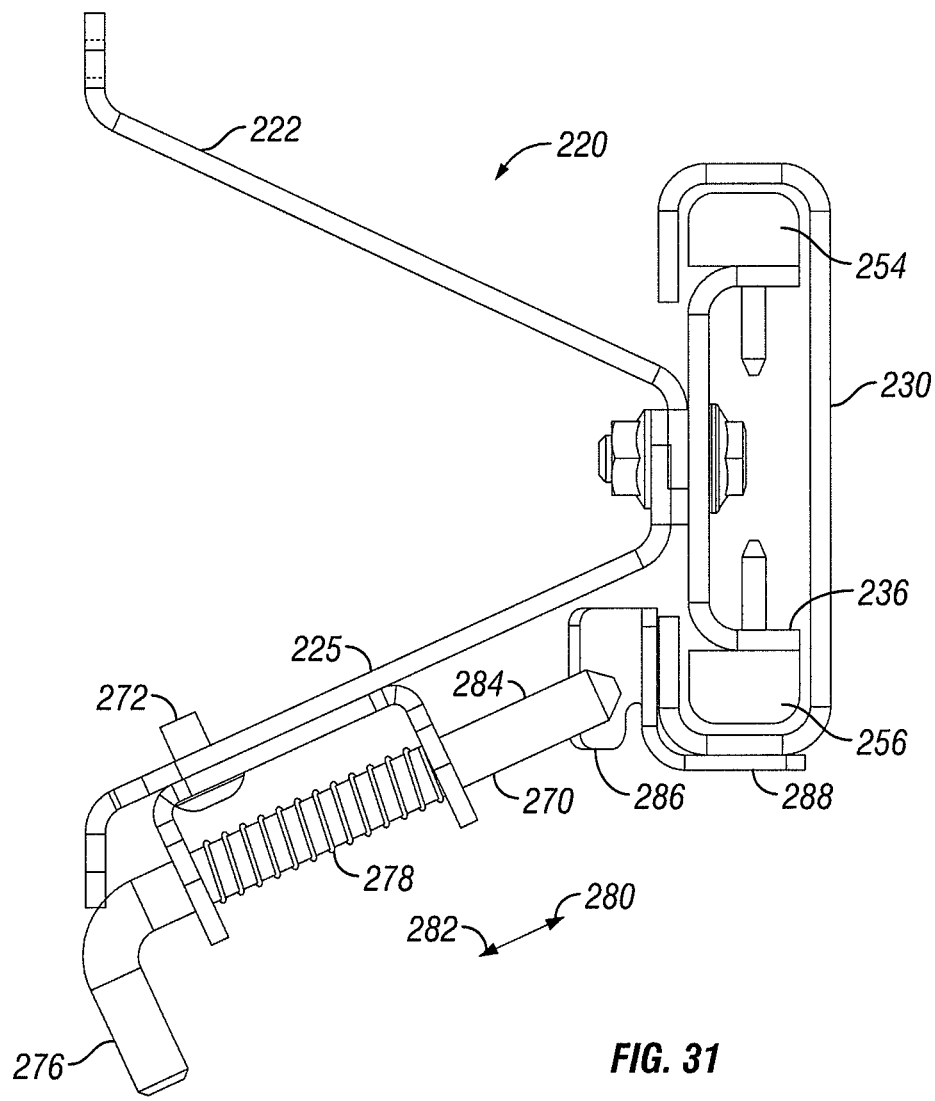
FIG. 31 is another end view of the illustrative embodiment of the sling bag rail assembly with a sliding rail coupled thereto.

An end view of sliding rail assembly 220 with sliding rail 230 coupled thereto is shown in FIG. 31. This view, similar to the view in FIG. 29, showing brackets 222 and 225 along with bracket 236 and latch assembly 270. Sliding rail 230 is located adjacent bearings 254 and 256, and has an illustrative C-shaped profile. It is appreciated that other profiles may be employed, such as round, square or other shape configurable to slide or move along a bearing. Stop 286 is attached to sliding rail 230 via illustrative bracket 288. In the illustrated embodiment, stop 286 is positioned adjacent the end of sliding rail 230 facing exterior of vehicle cargo area 2. Tip 284 of handle 276 is configured to be pushed in direction 280 to engage stop 286 as illustratively shown. Latch assembly 270 is configured so that handle 276 can be pulled in direction 282 to move tip 284 out of the way from stop 286. During this movement, spring bias from spring 278 is overcome allowing tip 284 to move in direction 282 to free slide rail 230. Conversely, when handle 276 is released, bias from spring 278 moves tip 284 in direction 280 thereby positioning tip 284 in a blocking position relative to stop 286. By blocking stop 286, movement of sliding rail 230 is curtailed.

Figure 32:
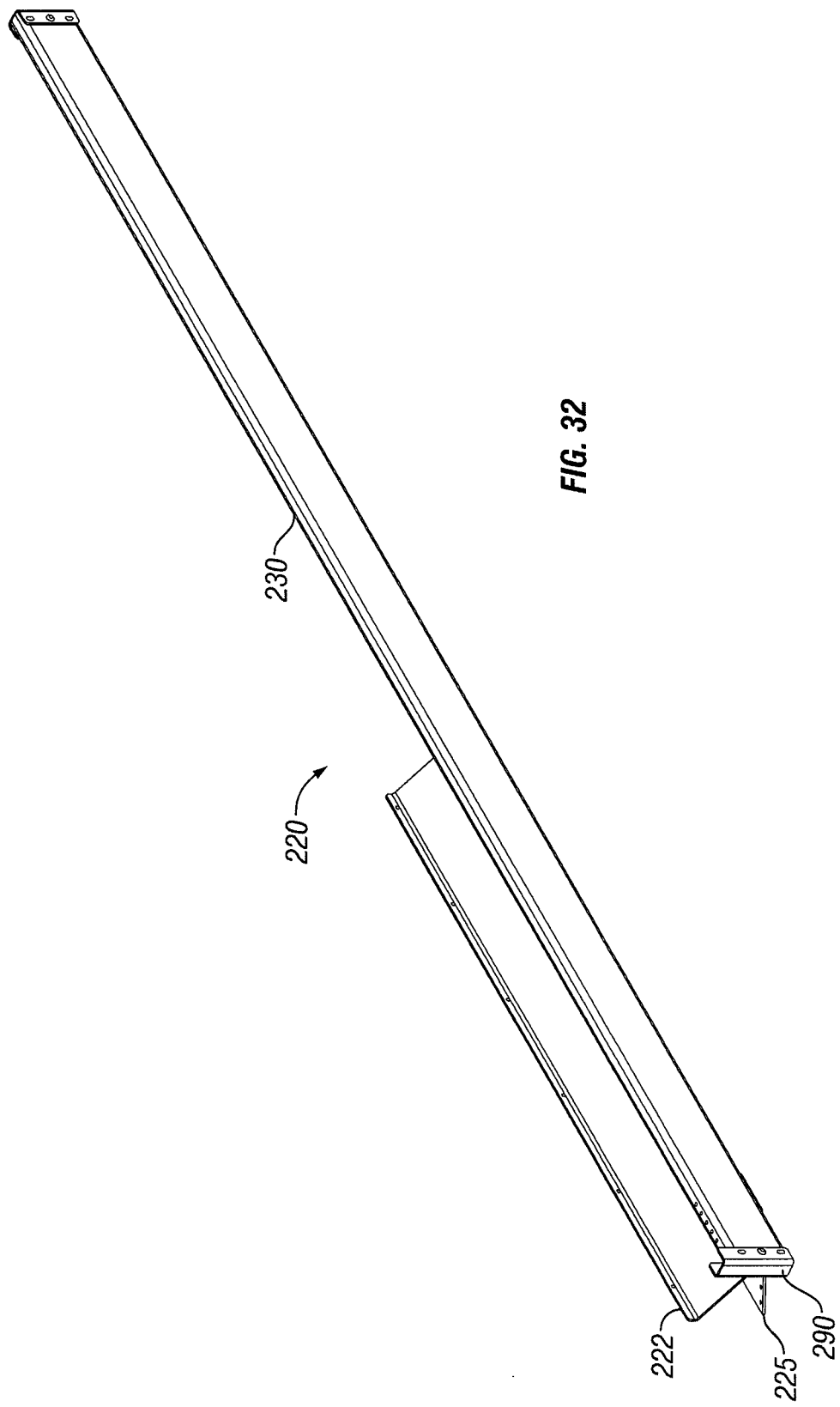
FIG. 32 is a perspective view of a portion of the sling bag rail assembly.

A perspective view of sliding rail assembly 220 is shown in FIG. 32. This view illustrates the relative positioning of sliding rail 230 to brackets 222 and 225. As this illustrative embodiment shows, the length of sliding rail 230 is longer than brackets 222 and 225. It is appreciated that such brackets can be sized to accommodate the needs of the particular vehicle. In addition, an end cap 290 is shown fastened to the end of sliding rail 230.

Figure 33:
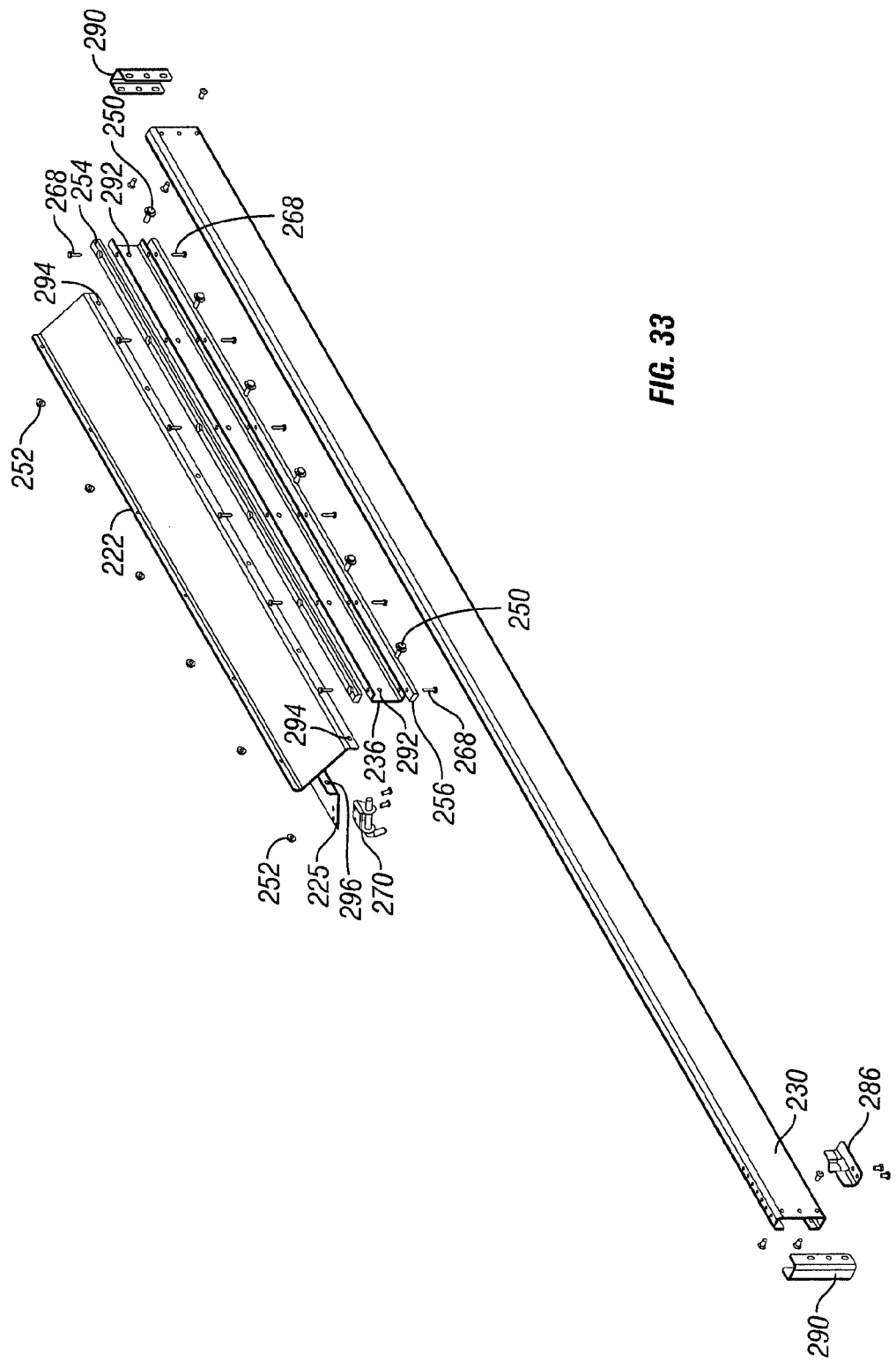
FIG. 33 is an exploded view of a portion of the sling bag rail assembly.

An exploded perspective view of sliding rail assembly 220 is shown in FIG. 33. This view depicts how brackets 222 and 225 are assembled to guiderail 236 via multiple fasteners and nuts 250 and 252, respectively. Extending bolts 250 through bores 292, 294 and 296, respectively, and coupling with nuts 252, brackets 222, 225 and guiderail 236 are assembled to their final shape. Bearing rails 254 and 256 are shown attachable to guiderail 236 via a plurality of fasteners 262 and 268 spaced along rails 254 and 256, respectively. Lastly, latch assembly 270 is shown attached to bracket 225 via fasteners 272.

Figure 34:
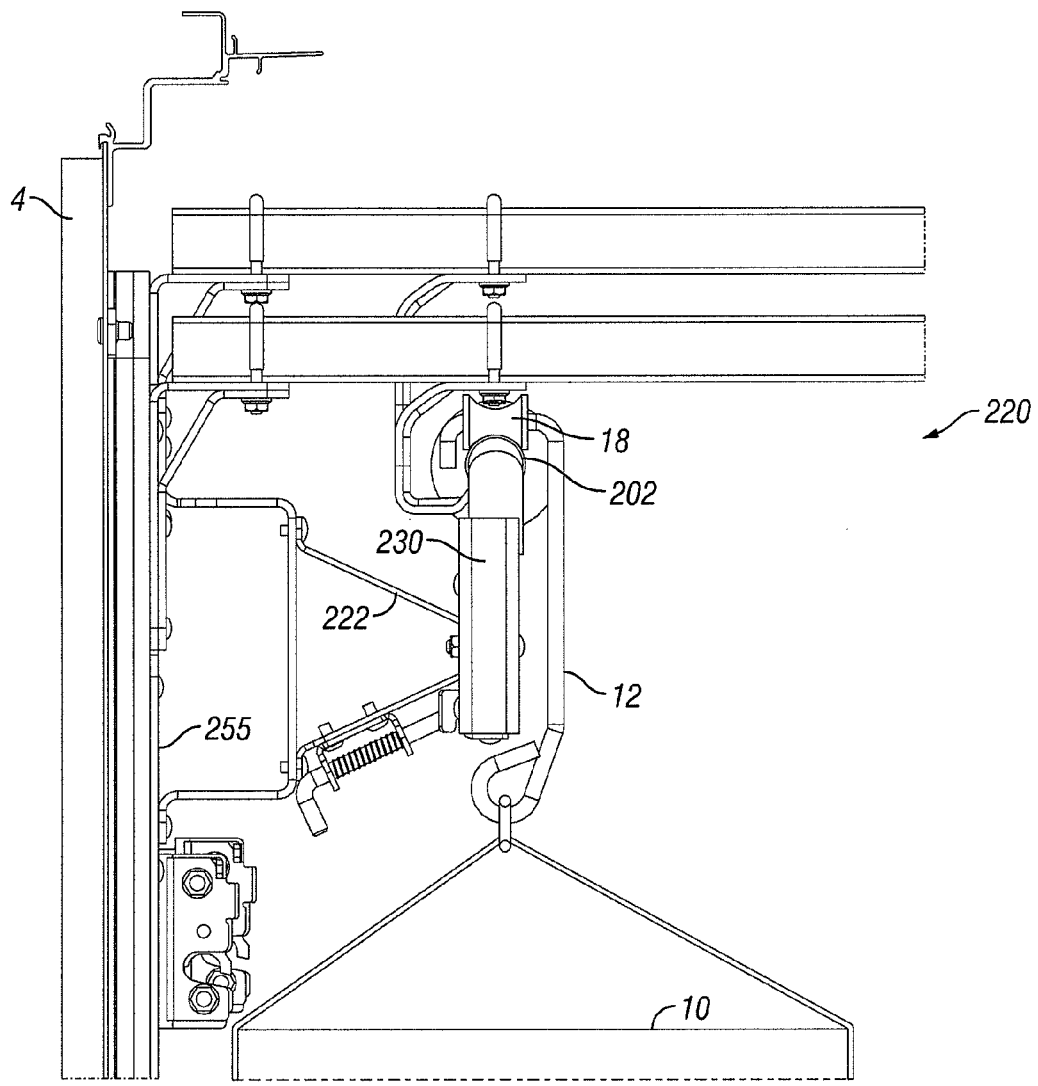
FIG. 34 is a detail end view showing an illustrative embodiment of the sling bag rail assembly.
Figure 35B:
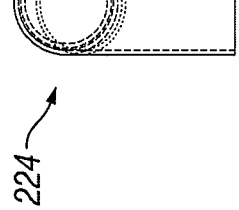
FIGS. 35a-d are perspective, front, side, and underside views of an angled portion of a rail from the illustrative embodiment of the sling bag rail assembly.
Figure 35D:
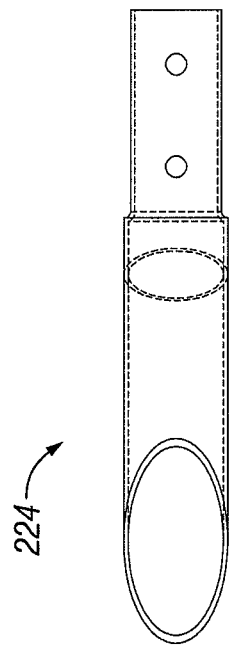
Figure 35A:
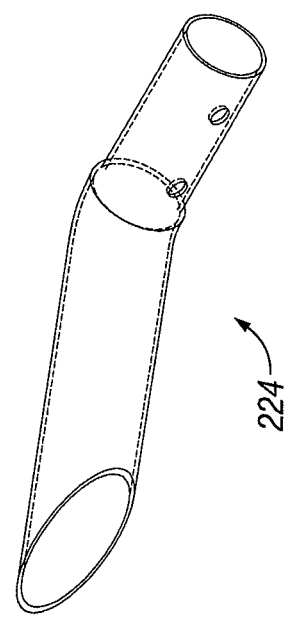
Figure 35C:
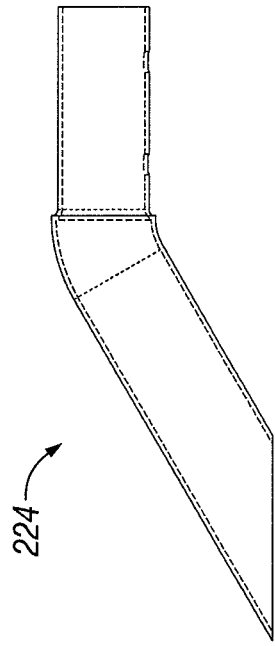

An end view of sling rail assembly 220 is shown in FIG. 34. This view also shows sling rail 230 suspended via sling rail mount 222 mounted to sling mount backer plate 255 fastened to wall 4 of vehicle 1. This embodiment further shows roller hanger 12 having a top roller 18 to assist transporting sling bag 10 over rail 202.

Perspective, top, side, and underside views of angled portion 224 used on the illustrative bag rail system 220 are shown in FIGS. 35a-d. As previously discussed, transition 224 is configured to serve as a ramp for hangers 206 when they slide from rail 202 onto rail assembly 220. Because as shown in FIGS. 25-27, rail 202 and rail assembly 220 are illustratively positioned parallel to each, but rail 202 is higher than rail assembly 220, bag 204 (or 10 for that matter) drop down onto rail 230 (or 8 for that matter) before being extended to the exterior of vehicle 1.

Figure 36B:
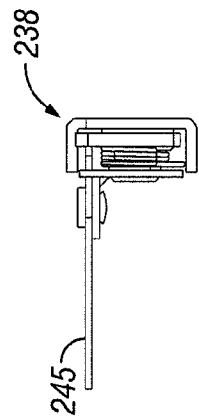
FIGS. 36a-d are perspective, top, front and side views of a bag latch from the illustrative embodiment of the sling bag rail assembly.
Figure 36D:
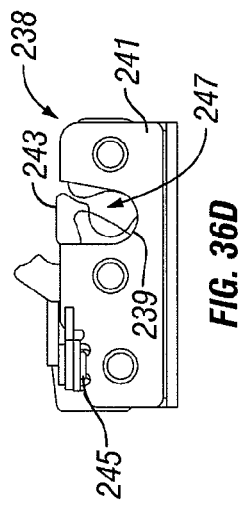
Figure 36A:
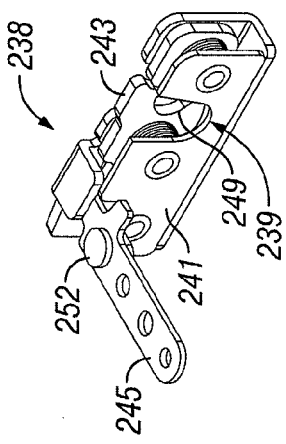
Figure 36C:
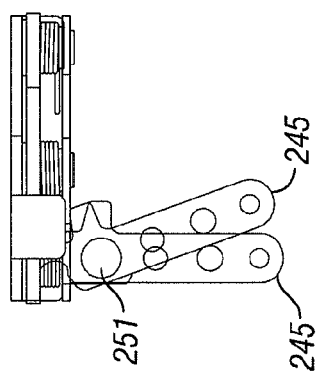

Perspective, top, front, and side views of bag latch 238 are shown in FIGS. 36*a-d*. These illustrative latches are configured to selectively hold bags 204 in place, so the bags do not inadvertently move along rail 202 while vehicle 1 is traveling. Latch 238 includes a slot 239 formed in housing 241, a latch member 243 and a release arm 245. As shown in FIG. 36*a*, latch arm 243 is in the locked position. Latch member 243 includes an opening 247 (see, e.g. FIG. 36*d*) that is configured to receive bar 211 positioned about the periphery of opening 212 of bag 204. Latch 238 is configured so that bar 211 enters slot 239 when member 243 is not obstructing slot 239. Bar 211 is configured to engage a back end 249 which moves member 243 to block slot 239, effectively holding bar 211 and thus bag 204 in place. Release handle 245 is pivotable about axis 251 as shown in FIG. 36*c* wherein engaging handle 245 releases member 243 allowing bar 211 to be pulled from slot 239 away from latch 238 allowing bag 204 to move.

Figure 37B:
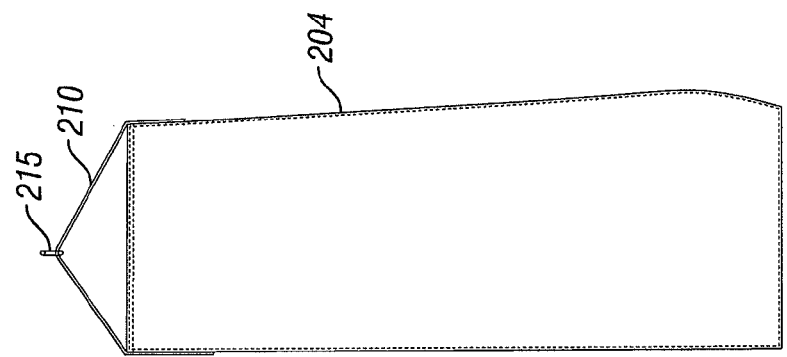
FIGS. 37a and b are front and side views of an illustrative embodiment of a bag.
Figure 37A:
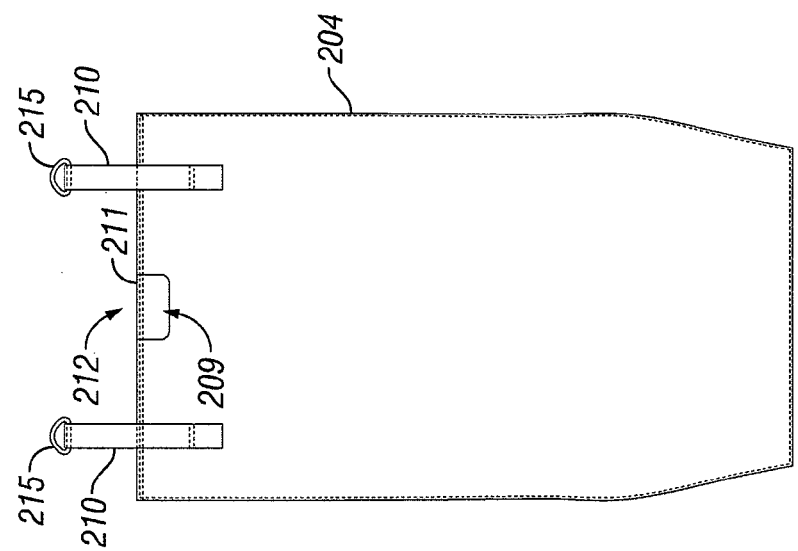

Front and side views of an illustrative embodiment of a bag, or sling bag, 204 are shown in FIGS. 37*a* and *b*. As previously discussed, bags 204 (or bags 10 for that matter) are configured to suspend on rails 202 (or 20) to hold soiled laundry. A plurality of bags can be employed in vehicle 1 so that laundry can be sorted by any particular desired type. An illustrative embodiment of bag 204 includes a top opening 212 and straps 210 to maintain opening 212 while suspended on rail 202. In the embodiment shown, an opening 209 with a top bar 211 is present to attach to latch 238 for holding bag 204 in place. It is further appreciated that bar 211 can be part of a frame located around the periphery of opening 212 to keep the top of bag 204 open. Although not shown in this embodiment, bags 204 may open illustratively at the bottom to dispense the soiled laundry to an awaiting cart below. Rings 215 are configured to couple straps 210 to hangers 206.

Figure 38B:
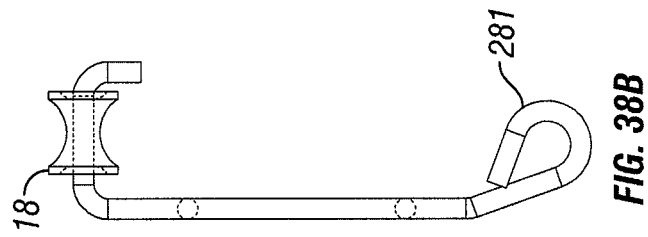
FIGS. 38a and b are front and side views of an illustrative embodiment of a bag hanger.
Figure 38A:
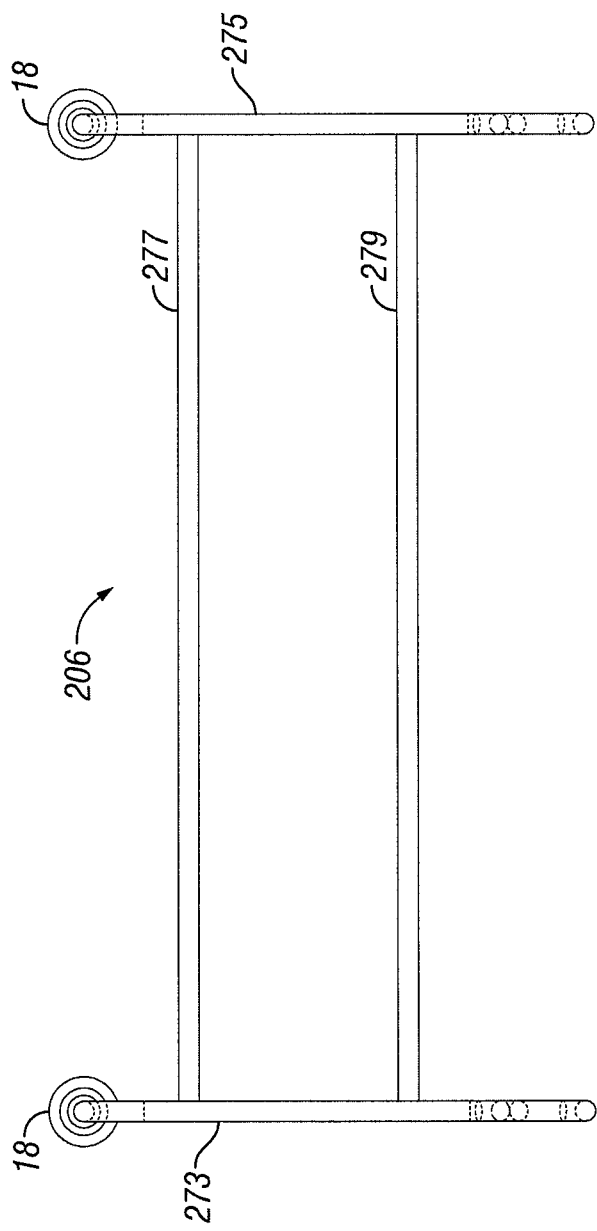

Front and side views of hanger 206 are shown in FIGS. 38*a* and *b*. In this illustrative embodiment, hanger 206 differs from hanger 12 in that hanger 206 is a single hanger unit including hanger portions 273 and 275 that are tied together via illustrative braces 277 and 279. This arrangement allows for a more rigid hanging structure that keeps bags 204 open at the top. Rollers 18 assist moving hanger 206 along rail 202 and rail 230. An illustrative loop 281 is configured to attach to ring 215 coupling hanger 206 to bag 204.

Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A cargo vehicle comprising:
   a cargo area that includes an internal surface;
   a longitudinally extending bar located within the cargo area of the vehicle;
   a bag having a first opening;
   wherein the bag includes a hanger that is hangable onto and is slidable along the longitudinally extending bar;
   a movable rail assembly attached to the internal surface, the movable rail assembly comprising:
   a rail movable between extend and retract positions with respect to the cargo area;
   a bearing engageable with the rail to assist moving the rail between the extend and retract positions; and
   a bracket attachable to the bearing to suspend the bearing and the rail in the cargo area and away from the internal surface;
   wherein the hanger is movable along both the bar and the rail of the movable rail assembly; and
   wherein the rail is configured so at least a portion of the rail is movable exterior of the cargo area with the bag hanging on the rail so the bag is positionable exterior of the vehicle.

2. The cargo vehicle of claim 1, further comprising a transition bar located between the bar and the rail to provide a transition for the hanger when moving between the bar and rail.

3. The cargo vehicle of claim 1, wherein the bearing is a longitudinally extending bearing the rail is configured to be slidable on to move between the extend and retract positions.

4. The cargo vehicle of claim 1, wherein the bearing is a plurality of roller bearings the rail is configured to be slidable on to move between the extend and retract positions.

5. The cargo vehicle of claim 1, further comprising stop member selectively engageable with the rail to selectively inhibit movement of the rail.

6. The cargo vehicle of claim 1, wherein the rail and bar are positioned substantially parallel to and space apart from each other.

7. The cargo vehicle of claim 1, wherein the internal surface is a sidewall of the cargo area of the vehicle.

8. The cargo vehicle of claim 7, wherein the bracket is attached to the sidewall and configured to hold the hanger away from the sidewall.

9. The cargo vehicle of claim 1, wherein the bar is sized to receive a plurality of bags.

10. The cargo vehicle of claim 1, further comprising a latch configured to selectively hold the bag in a location in the cargo area until the latch releases the bag.

11. The cargo vehicle of claim 1, wherein the bag includes a second opening.

12. The cargo vehicle of claim 1, wherein the hanger includes a roller to assist moving the bag between the rail and the bar.

13. The cargo vehicle of claim 1, wherein the hanger holds the first opening in an open condition.

14. A method of distributing clothing via a delivery vehicle, the method comprising the steps of:
   providing a longitudinally extending bar located within a cargo area of the delivery vehicle, and a bag that includes a hanger that hangs onto the longitudinally extending bar suspending the bag in the cargo area;
   receiving soiled laundry;
   placing the soiled laundry in the bag while the bag hangs on the bar;
   sliding the bag containing the soiled laundry along the bar and onto a movable rail of a rail assembly that also includes a bearing engageable with the rail allowing the rail to move, and a bracket attachable to the bearing to hold the bearing and the rail in the cargo area;
   moving the rail with the bag hanging thereon to an extended position so at least a portion of the rail and the bag is located exterior of the delivery vehicle; and
   making the soiled laundry in the bag available to be removed from the bag exterior or the vehicle.

15. The method of distributing clothing via the delivery vehicle of claim 14, further comprising the step of providing a transition bar positioned between the bar and the rail.

16. The method of distributing clothing via the delivery vehicle of claim 14, further comprising the steps of providing a stop member; and selectively engaging the stop member with the rail to release the rail.

17. The method of distributing clothing via the delivery vehicle of claim 14, further comprising the steps of providing a plurality of bags that hangs onto the longitudinally extending bar suspending the plurality of bags in the cargo area; and placing the soiled laundry in the bag while the bag hangs on the bar.

18. The method of distributing clothing via the delivery vehicle of claim 14, further comprising the steps of unlatching a latch releasing the bag to slide the bag along the bar and rail.

\* \* \* \* \*